(12) United States Patent
Berten

(10) Patent No.: US 12,124,072 B2
(45) Date of Patent: Oct. 22, 2024

(54) BARRIER ELEMENT ARRANGEMENT FOR A GATE OF AN ACCESS CONTROL SYSTEM

(71) Applicant: Scheidt & Bachmann GmbH, Mönchengladbach (DE)

(72) Inventor: Julius Berten, Mönchengladbach (DE)

(73) Assignee: Scheidt & Bachmann GmbH, Mönchengladbach (DE)

( * ) Notice: Subject to any disclaimer, the term of this patent is extended or adjusted under 35 U.S.C. 154(b) by 0 days.

(21) Appl. No.: 18/598,904

(22) Filed: Mar. 7, 2024

(65) Prior Publication Data

US 2024/0319430 A1 Sep. 26, 2024

(30) Foreign Application Priority Data

Mar. 21, 2023 (DE) ...................... 10 2023 107 095.9

(51) Int. Cl.
| | |
|---|---|
| *H05B 47/16* | (2020.01) |
| *E06B 11/08* | (2006.01) |
| *F21V 8/00* | (2006.01) |

(52) U.S. Cl.
CPC .............. *G02B 6/006* (2013.01); *E06B 11/08* (2013.01); *G02B 6/0068* (2013.01); *G02B 6/0076* (2013.01); *H05B 47/16* (2020.01)

(58) Field of Classification Search
CPC .... G02B 6/006; G02B 6/0068; G02B 6/0076; H05B 47/16; E06B 11/08
See application file for complete search history.

(56) References Cited

U.S. PATENT DOCUMENTS

| | | | |
|---|---|---|---|
| 9,841,551 B2* | 12/2017 | Gierens ..................... | B32B 7/12 |
| 2017/0205552 A1 | 7/2017 | Gierens et al. | |
| 2023/0250599 A1* | 8/2023 | Krätzig ............. | B32B 17/10036 404/6 |

OTHER PUBLICATIONS

European Patent Office, Office Action, Application No. 24160817.3, dated Aug. 5, 2024, 6 pages (in German).

* cited by examiner

*Primary Examiner* — Leah Simone Macchiarolo
(74) *Attorney, Agent, or Firm* — Sunstein LLP

(57) ABSTRACT

A barrier element composite for a barrier element arrangement of a gate of an access control system includes at least one first substantially optically transparent barrier element comprising a first side surface having a first light coupling area, a second side surface having at least one first light decoupling area and a third side surface forming a first visible surface and arranged opposite to the second side surface, at least one second substantially optically transparent barrier element comprising a first side surface having a second light coupling area, a second side surface having at least one second light decoupling area and a third side surface arranged opposite to the second side surface, wherein the third side surface of the second barrier element is connected to the second side surface of the first barrier element. An at least partially substantially optically transparent separation layer is arranged between the third side surface of the second barrier element and the second side surface of the first barrier element. Light decoupled through the first light decoupling area and the second light decoupling area is visible at the third side surface of the first barrier element.

19 Claims, 11 Drawing Sheets

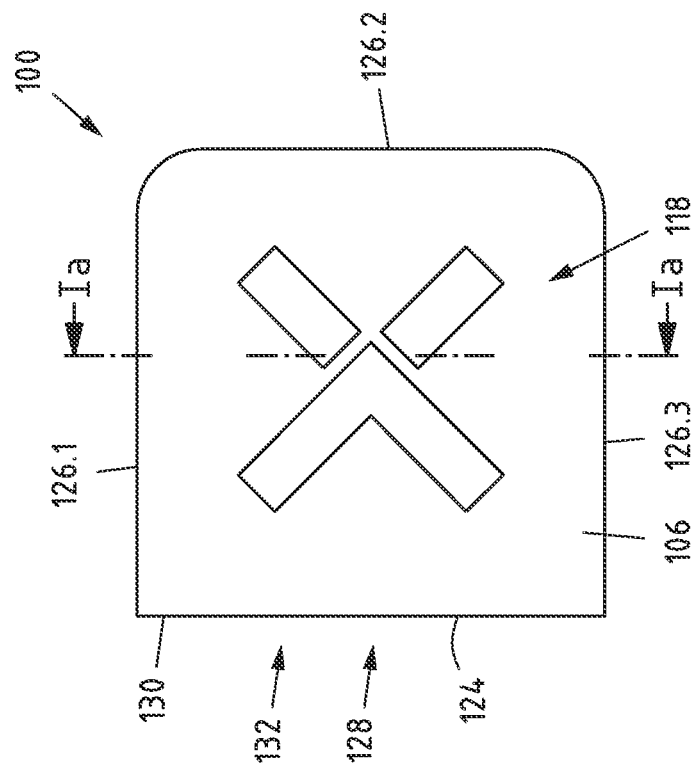
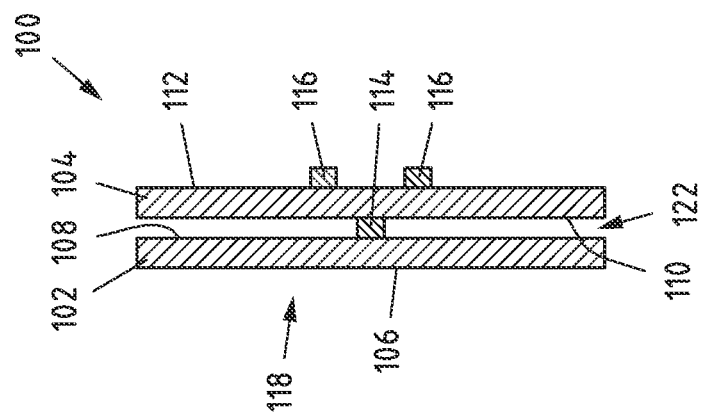

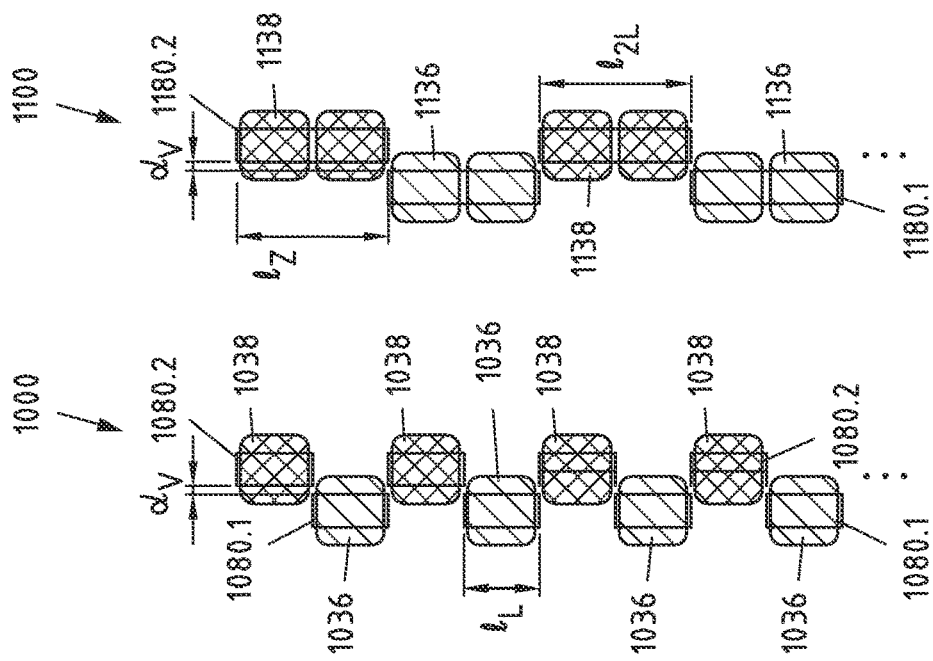
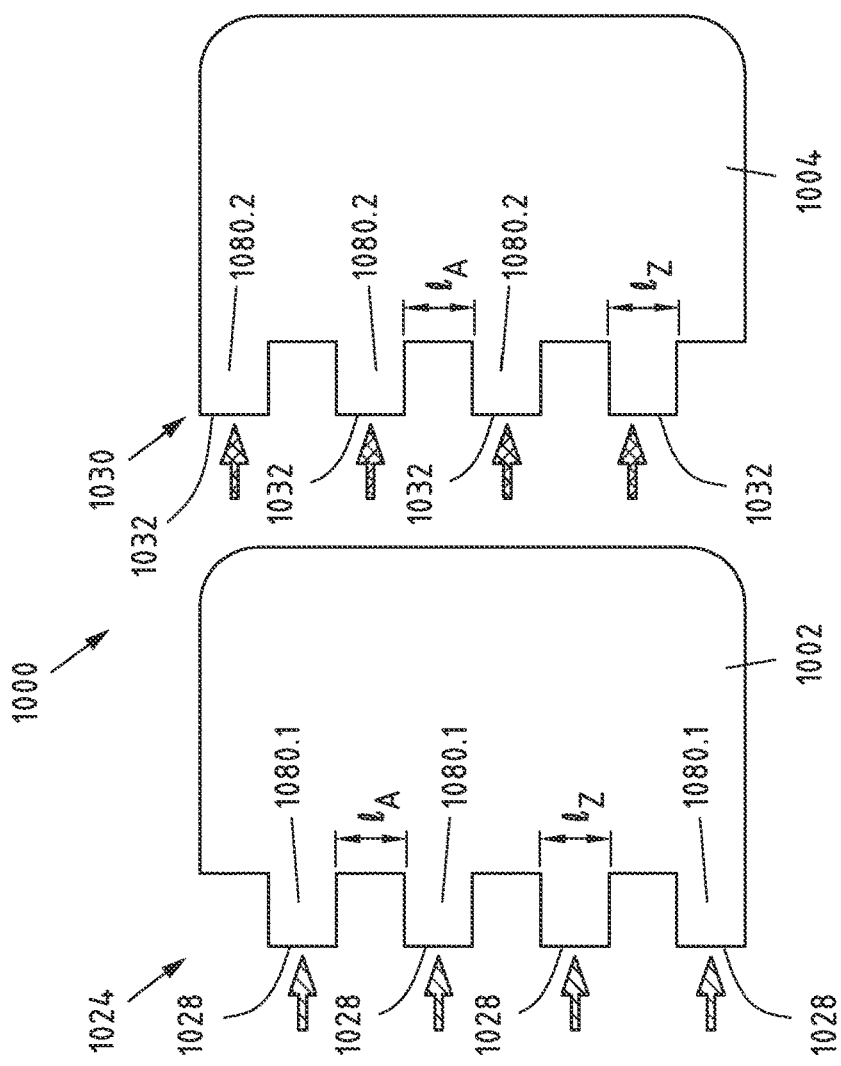

BARRIER ELEMENT ARRANGEMENT FOR A GATE OF AN ACCESS CONTROL SYSTEM

CROSS-REFERENCE TO RELATED APPLICATIONS

This application claims the benefit of German patent application No. 10 2023 107 095.9, filed Mar. 21, 2023, the disclosure of which is incorporated herein by reference in its entirety.

TECHNICAL FIELD

The application relates to a barrier element composite for a barrier element arrangement of a gate of an access control system. In addition, the application relates to a barrier element composite set, a barrier element arrangement, a gate of an access control system and a (computer-implemented) method for operating a gate.

BACKGROUND ART

Access control systems respectively entry control systems for controlling access from a first area to a second area are known from the prior art. For example, access (respectively entry) from an uncontrolled area to a controlled area and/or access (respectively exit) from a controlled area to an uncontrolled area may be controlled by means of an access control system.

Access control systems according to the present application thus serve to control an entering respectively going into a controlled area by a user or a leaving respectively exiting a controlled area by a user. In particular, an access control system according to the application is not an access system in which a driving into a controlled area by a vehicle or a driving-out from a controlled area by a vehicle is controlled.

An access control system typically comprises at least one gate (also referred to as a gate). A gate is configured to selectively block and selectively release an entering (i.e., in particular to allow entering) from a first area to a second area. A gate can, in particular, ensure that only authorized users can pass through respectively go through an entrance and/or exit of a controlled area, for example, in order to enter the controlled area and/or to leave the controlled area.

Access control systems are used, for example, in passenger transport systems, but also in other applications in which an authorization of users is to be checked, such as at sporting, cultural and/or leisure events. Access control systems can also be configured to verify the authorization of a user to be in a controlled area. The result of the verification can be indicated, for example, by means of a display of an access barrier.

Known access control barriers are configured to verify a user's access authorization before releasing a passing of the gate. For example, access control systems are known in which an access medium of a user is verified before a release. For controlling respectively verifying the authorization of the user for staying in a controlled area, a gate may comprise at least one interface equipment. The interface equipment is configured to receive an access authorization of the user, which is stored, for example, in the access medium or to receive a user identification which is linked to an access authorization stored on the system side, or which represents a payment means with which the use of the controlled area can be paid.

A gate usually comprises at least one base and at least one barrier element arrangement movably arranged at the base. In particular, it is known from the prior art that the barrier element arrangement can be formed by a panel-shaped respectively disk-shaped barrier element. This barrier element can be moved, for example, by an actuator integrated in the base (e.g., an electric motor). In particular, the barrier element can be moved between an open position and a closed position. In the open position, the passage through the gate is, in particular, released, i.e., a user can pass through the gate. In the closed position, in particular, the passage is blocked, i.e., a user is (physically) prevented from passing through the gate.

In an initial state, a gate is usually blocked. As has been described, this means that the barrier element arrangement physically prevents the user from passing through the gate. In other cases, a gate can be open in the initial state and close only when a user without a valid access authorization respectively a valid access medium attempts to pass through the gate. Without limiting generality, it is hereinafter assumed that a gate is blocked in the initial state and opens upon a positive verification of a user's access authorization for the user to go through.

As a rule, a gate is only operated in one direction of passage, i.e., in a specific passage direction state. This means that users can only (properly) pass through a gate in one direction. For example, in this operating state, the access barrier can only allow entry into the controlled area or only exit from the controlled area.

However, the passage direction of a gate respectively the passage direction state can be changed during operation, in order to provide, for example, a passing of the gate in a first passage direction during a first time period and a passing of the gate in the opposite passage direction during another time period.

However, it is often problematic for users to recognize in which direction a gate is (currently) being operated. It is known from the prior art to indicate on a (small) screen respectively display of the gate of the gate whether passing the gate in the desired passage direction of a user at the gate is possible or not. In particular, it is often difficult for users to recognize where the gates that are (currently) operating in the desired direction of passage of the user are located in a series of gates (gate array) arranged next to each other.

However, this displaying is often only sufficiently visible to the user directly in front of the gate. In addition, defective gates or barriers that are currently not ready for use for other reasons are often only visible to the user when the user is directly at the gate. On the one hand, this leads to reduced user comfort. On the other hand, this reduces the throughput through the at least one gate, and in particular, also reduces the overall throughput through a gate array if the user lacks an overview respectively orientation.

Document US 2017/0205552 A1 discloses a barrier element arrangement with two transparent and interconnected barrier elements, wherein an optical separation layer is arranged between these barrier elements. The barrier element arrangement comprises a light source device, wherein light coupled into the first barrier element at a first side surface of the first barrier element is visible by means of a light decoupling area at a second side surface of the first barrier element, which forms the front side of the barrier element arrangement. According to US 2017/0205552 A1, light coupled into the second barrier element at a first side surface of the second barrier element is visible by means of a light decoupling area at a second side surface of the second barrier element, which forms the rear side of the barrier element arrangement. This makes it possible to display a specific first symbol on the front of the barrier element arrangement, while a different symbol can be displayed on the rear side of the barrier element arrangement.

Even if the perception for a user at a gate is improved with an accordingly formed barrier element arrangement, the perception of the lighting at such a barrier element arrangement by persons approaching a respective gate remains limited in terms of visibility, informative value, and clarity. Accordingly, gates that are currently not ready for use are still only recognizable to the user when the user is almost directly at respectively in front of the gate so that user comfort is still reduced. In addition, the throughput through the at least one gate, in particular, through a series of gates arranged next to each other (also referred to as a gate array), which can be operated in different passage directions, for example, in the manner described, is still not optimal.

Therefore, the object of the application is to provide a possibility which improves user comfort, in particular, by increased visibility, informative value, and clarity at a gate and, in particular, enables an increase in throughput at the gate respectively at a series of a plurality of gates (gate array).

SUMMARY OF THE INVENTION

The problem is solved according to a first aspect of the application by a barrier element composite for a barrier element arrangement of a gate of an access control system. The barrier element composite comprises at least one first substantially optically transparent barrier element comprising a first side surface having a first light coupling area, a second side surface having at least one first light decoupling area and a third side surface (forming a visible surface of the barrier element composite) arranged opposite to the second side surface. The barrier element composite comprises at least one second substantially optically transparent barrier element comprising a first side surface having a second light coupling area, a second side surface having at least one second light decoupling area and a third side surface arranged opposite to the second side surface. The third side surface of the second barrier element is connected to the second side surface of the first barrier element. An at least partially substantially optically transparent separation layer is arranged between the third side surface of the second barrier element and the second side surface of the first barrier element. Light decoupled by means of the first light decoupling area and the second light decoupling area is (essentially only) visible on the third side surface of the first barrier element.

In contrast to the prior art, the application provides a barrier element composite with two interconnected barrier elements, in which both the light decoupled from the first barrier element and the light decoupled from the second barrier element is essentially only visible on the third side surface of the first barrier element, thus creating a possibility that improves user comfort, in particular, by increasing visibility, informative value, and clarity at a gate. In particular, this enables an increase in throughput at the gate respectively at a series of a plurality of gates (gate array). Preferably, the at least one second light decoupling area is arranged on the second barrier element in such a way that the light decoupled from the second barrier element penetrates the optically transparent first barrier element, passes through it and then emits at the third side surface of the first barrier element.

A barrier element composite according to the application is at least a part of a barrier element arrangement. A barrier element arrangement serves, in particular, as a (physical) barrier element of a gate. In particular, a gate comprises at least one base and at least one barrier element arrangement arranged movably at the base, the barrier element arrangement comprising at least one barrier element composite according to the application.

The essentially optically transparent barrier element composite is, in particular, formed by at least two interconnected barrier elements. A separation layer is arranged between the first barrier element and the second barrier element. The at least two barrier elements are essentially optically transparent. The separation layer is at least partially substantially transparent. Preferably, one section respectively area of the separation layer can be non-transparent, and at least one section respectively area can be substantially optically transparent.

In the present case, essentially optically transparent means, in particular, that the predominant part of the visible electromagnetic radiation is transmitted by such a barrier element respectively such a separation layer. An essentially optically transparent barrier element respectively an essentially optically transparent separation layer means, in particular, a barrier element respectively a separation layer with a light transmittance of at least greater than 70%, preferably greater than 75%.

The optically transparent separation layer may, for example, be formed at least partially by air. The separation layer according to the application can alternatively or additionally be a separation foil, for example, a polymeric separation foil, such as a PVC (polyvinyl chloride) separation foil. According to one embodiment of the barrier composite, the separation foil can be a self-adhesive (on both sides) separation foil. Particularly preferably, the separation layer can be formed at least partially by a non-transparent cover layer (described in more detail below) and a (transparent) air layer arranged next to respectively adjacent to the non-transparent cover layer.

The separation layer can, in particular, be configured to (mechanically) join respectively connect the at least two barrier elements to one another and, in particular, to simultaneously optically separate said barrier elements from one another.

The separation layer can preferably have a thickness of between 0.05 mm and 10 mm, particularly preferably between 0.15 mm and 0.5 mm.

According to a preferred embodiment, a (first and/or second) barrier element can be formed from an essentially transparent plastic. Preferably, a (first and/or second) barrier element can be formed from acrylic glass and/or polymer carbonate.

According to the application, the first barrier element and the second barrier element each comprise at least one first side surface with a first light coupling area and a second light coupling area, respectively. A respective light coupling area is, in particular, at least one partial area of a respective first side surface of a respective barrier element, at which light can be coupled into respectively introduced by a light source device of the barrier element arrangement. The coupled light can propagate in the respective barrier element. In other words, a barrier element is, in particular, configured as a light guide in the present case. As will be described, in one embodiment of a barrier element arrangement, a first light source device can be connected to the at least one first light coupling area of the first barrier element, and a second light source device can be connected to the at least one second light coupling area of the second barrier element.

Furthermore, a respective barrier element comprises a second side surface and a third side surface opposite the second side surface. The respective second side surface comprises at least one first light decoupling area and at least one second light decoupling area, respectively. The third side surface of the first barrier element forms, in particular, a visible surface of the barrier element composite. In particular, a barrier element composite according to the application comprises exactly one visible surface, which is formed by the third side surface of the first barrier element, which is located opposite the second side surface of the first barrier element and opposite at least the second side surface of the second barrier element.

A light decoupling area respectively a diffusion area is, in particular, characterized by the fact that the light impinging on the light decoupling area is deflected in such a way that it is decoupled from the respective barrier element through the respective third side surface, i.e., that the light propagating in the barrier element is deflected at the light decoupling area in such a way that it is transmitted through the respective third side surface.

In the present case, a light decoupling area is, in particular, to be understood as a surface area on a respective outer second side surface of a respective barrier element, which enables the light to be absorbed in this surface area of the barrier element. At this at least one surface area, the light propagating in the barrier element can be absorbed and, in particular, diffusely emitted into the environment, in particular, in the direction of the respective third side surface and thus in the direction of the visible surface of the barrier element composite.

According to a preferred embodiment of the barrier element composite according to the application, the (optical) separation layer can be characterized in that the separation layer refractive index of the separation layer can be (at least partially) at least smaller than a first barrier element refractive index of the first barrier element and a second barrier element refractive index of the second barrier element. In this way, it can be achieved that the respectively coupled light propagates in the respective barrier element and, in particular, cannot diffuse uncontrolled into the respective other barrier element, but only by means of an arranged light decoupling area.

According to a further embodiment of the barrier element composite according to the application, the separation layer refractive index may be (at least partially) at least less than 1.5. Preferably, the separation layer refractive index may be between 1 and 1.49. In particular, in addition, the at least one (first or second) barrier element refractive index may be greater than or equal to 1.5. Preferably, the at least one (first or second) barrier element refractive index may be between 1.5 and 1.9. In particular, said values refer to normal conditions at a wavelength of 589 nm (yellow-orange) of the sodium D-line.

In general, there are various ways of forming a light decoupling area on an outer side of a barrier element. According to a preferred embodiment of the barrier element composite according to the application, the first light decoupling area can be formed by a roughened surface area and by an optically non-transparent cover layer arranged over the roughened surface area. Alternatively or additionally, the second light decoupling area can be formed by a roughened surface area and by an optically non-transparent cover layer arranged above the roughened surface area. In particular, the surface of a light decoupling area can be rougher than the surface of the surrounding area of the light decoupling area. In a simple way, absorption of the light in a specific surface area of the barrier element can be generated by roughening the corresponding surface area.

In particular, a first surface area is rougher than another (neighboring) surface area of a respective second side surface if the average roughness value Ra of the first surface area is greater than the average roughness value Ra of the other (neighboring) surface area. Preferably, the average roughness value $Ra_{LA}$ of the surface of the at least one light decoupling area can be greater than the average roughness value $Ra_{U}$ of the surface of the area surrounding the light decoupling area. A roughness measurement can be carried out in accordance with the DIN EN ISO 25178 standard, for example.

Preferably, a light decoupling area on a barrier element can be made by sandblasting. In particular, only the surface area that is to serve as the light decoupling area can be sandblasted. A light decoupling area (in particular, in a defined symbol shape or partial symbol shape) can be provided in a simple manner. It shall be understood that in variants of the application, the roughening can also be made by a different method.

In order to ensure, in particular, that the light impinging onto the roughened surface area is (always) deflected in the direction of the (respective) opposite third side surface, an optically non-transparent cover layer can be arranged over the (respective) roughened surface area. In particular, the cover layer is applied from the outside and essentially (only) covers the roughened surface area (possibly with a tolerance range). The cover layer can preferably be an adhesive foil. Preferably, the cover layer can be white.

According to a further embodiment of the barrier element composite according to the application, the at least one at least partially optically transparent separation layer can be formed by the at least one cover layer arranged between the second side surface of the first barrier element and the third side surface of the second barrier element and by an air layer located adjacent to the said cover layer. As has been described, the cover layer can be attached to a barrier element from the outside. In a connected state of the at least two barrier elements, the attached cover layer leads to a distance (corresponding to the thickness of the cover layer) between the first barrier element and the second barrier element. It has been recognized that in the areas where no cover layer is present, a further foil or the like can be dispensed with and the air layer present in these areas can be used as part of the separation layer. This can facilitate the production of a barrier composite. For example, a cover layer can be adhesive on both sides. Such a cover layer can then also be used to create the (permanent) bond between the barrier elements. It shall be understood that, alternatively or additionally, other means can be used to create the (permanent) connection.

According to a further embodiment of the barrier element composite according to the application, the first light decoupling area can be arranged offset from the second light decoupling area in such a way that when light is coupled into the first light coupling area, the light decoupled by means of the first light decoupling area is (only) visible on the third side surface of the first barrier element and that when light is coupled into the second light coupling area, the light decoupled by means of the second light coupling area is visible (only and in addition to the light decoupled through the first light decoupling area) on the third side surface of the first barrier element. Offset means, in particular, that, from the viewpoint of the third side surface of the first barrier element, the at least one first light decoupling area does not overlap with the at least one second light decoupling area. In other words, all light decoupled by the second light decoupling area is visible in addition to the light decoupled by the first light decoupling area. In a simple way, it can be achieved by an offset arrangement that both the light decoupled by means of the first light decoupling area and the light decoupled by means of the second light decoupling area are (completely) visible on the third side surface of the first barrier element.

According to a preferred embodiment of the barrier element composite according to the application, the first light decoupling area can form respectively be a first symbol shape. The second light decoupling area can form respectively be a partial symbol shape or a second symbol shape. The first light decoupling area and the second light decoupling area may together form a symbol shape composed of the first symbol shape and the partial symbol shape or the second symbol shape. As described above, the surface of the second side surface can be processed accordingly, for example roughened, to form a light decoupling area in the form of a symbol. A symbol respectively symbol shape is, for example, a circle, rectangle, arrow, letter, number, etc. respectively a respective shape. A partial symbol means a part of the aforementioned symbol in a corresponding manner.

Preferably, the first light decoupling area can be a first symbol. If light is only coupled into the first barrier element, only the first symbol illuminates on the third side surface of the first barrier element. If light is only coupled into the second barrier element, only the second symbol or the partial symbol illuminates on the third side surface of the first barrier element. When light is coupled into the first barrier element and into the second barrier element, the composite symbol illuminates on the third side surface of the first barrier element. In particular, this can further improve the visibility, informative value, and clarity of a gate.

Preferably, the at least two barrier elements are stacked in such a way that the (first) barrier element, which is very frequently required in the symbol combination or even comprises a symbol alone, is located in front of the at least one barrier element when the visible surface of the barrier element composite is viewed, which only forms a composite symbol together with the at least one other (second) barrier element. In particular, this prevents light from a frequently illuminated barrier element from unintentionally illuminating the at least one other barrier element. In particular, the reverse case has proven to be uncritical in practice, as all barrier elements are illuminated.

In principle, a barrier element can have any shape. According to a preferred embodiment of the barrier element composite according to the application, a barrier element can be a panel-shaped respectively disk-shaped barrier element. A panel-shaped barrier element respectively a barrier element plate comprises two flat sides and at least one narrow side. For example, an essentially rectangular barrier element plate has four narrow sides (i.e., a total of six side surfaces), while a circular or oval barrier element plate has one circumferential narrow side.

In a preferred embodiment, the first barrier element may comprise an essentially identical shape to the second barrier element. In particular, the dimensions (e.g., thickness (e.g., 1 mm-5 mm, preferably approx. 1.5 mm), width, length, diameter, outline shape, etc.) can be essentially the same for the at least two barrier elements that form the barrier element composite. The size of a flat side can preferably correspond substantially to the size of the composite symbol shape. In particular, in order to reduce unwanted light losses, the length and width of a barrier element respectively the barrier element composite can be selected so that they are only slightly larger than the composite symbol (e.g., 200 mm to 250 mm×200 mm to 250 mm).

According to a further embodiment of the barrier element composite according to the application, a reflective layer can be arranged on at least one fourth side surface (in particular, on all further side surfaces or partial side surfaces or narrow sides) of the first barrier element. Alternatively or additionally, a reflective layer can be arranged on at least one fourth side surface (in particular, on all other side surfaces or partial side surfaces or narrow sides) of the second barrier element. The at least one light decoupling area results in an intentional decoupling of the coupled light respectively the coupled light beams. However, light losses can occur at other interfaces of a barrier element respectively of a barrier element composite due to unwanted light emission. This in turn means that the intensity of the decoupled light decreases with increasing distance from the light coupling area. In order to further reduce unwanted light leakage, a reflective layer (e.g., in the form of a reflective foil) can be applied to the other boundary surfaces, in particular, a fourth side surface (preferably on all other narrow sides) of a barrier element respectively the barrier element composite. In particular, this results in a more uniform light intensity on the visible surface of the first barrier element composite. Visibility can thus be improved even further.

According to a further embodiment of the barrier element composite according to the application, the barrier element composite can comprise at least a third substantially optically transparent barrier element with a first side surface having a third light coupling area, a second side surface having at least one third light decoupling area and a third side surface opposite the second side surface. The third side surface of the third barrier element can be connected to the second side surface of the second barrier element. An at least partially substantially optically transparent separation layer can be arranged between the third side surface of the third barrier element and the second side surface of the second barrier element.

Light decoupled by means of the first light decoupling area, the second light decoupling area and the third light decoupling area can be visible (essentially only) on the third side surface of the first barrier element. In particular, a barrier element composite can be formed by two or more stacked barrier elements. The previous remarks on the first barrier element and second barrier element can be transferred, in particular, to the third (and any further) barrier element. In particular, the third light decoupling area is arranged offset from the second light decoupling area and the first light decoupling area such that when light is coupled into the third light coupling area, the light decoupled by means of the third light decoupling area is (only) visible on the third side surface of the first barrier element. When light is coupled into the first barrier element, into the second barrier element and into the third barrier element, a symbol composed of the first symbol, a second symbol or partial symbol and a third symbol (formed by the third light decoupling area) or partial symbol (formed by the third light decoupling area) illuminates on the third side surface of the first barrier element. In particular, this can further improve the visibility, informative value, and clarity of a gate.

Furthermore, it has been recognized that the coupling of light into barrier elements with a small thickness (e.g., 1 mm-3 mm) and a small distance (defined by the separation layer) between the first and second barrier element can cause problems. This is due, in particular, to the fact that the light sources available on the market, in particular, in the form of diodes, have larger dimensions (e.g., a thickness between 3.5 mm and 5 mm) than the thickness of the barrier elements and that it can therefore happen that light is at least partially coupled simultaneously into the first barrier element and into the second barrier element, although, for example, only light is to be coupled into the first barrier element. According to one embodiment, the thickness of the first barrier element and/or the second barrier element can be at least thicker than the thickness of a light source respectively a light source arrangement (formed by several light sources). Alternatively or additionally, the distance between the first barrier element and the second barrier element and thus the thickness of the separation layer can be increased.

According to a particularly preferred embodiment of the barrier element composite according to the application, the first light coupling area of the first side surface of the first barrier element can be formed by a first plurality of first pins protruding from the first side surface of the first barrier element. The second light coupling area of the first side surface of the second barrier element can be formed by a second plurality of second pins protruding from the first side surface of the second barrier element. In particular, in this embodiment, a barrier element with a thickness that is less than the thickness of the light sources can be used. In addition, the distance between the barrier elements respectively the thickness (e.g., 0.15 mm and 0.5 mm) of the separation layer can be small. In particular, the number and/or arrangement of the pins of a light coupling area can correspond to the number and/or arrangement of the light sources of a light source device respectively be matched to it.

Preferably, the plurality of pins can be arranged in a row on a first side surface. In particular, a comb-like arrangement can be provided. In particular, each first pin and second pin can have the same shape and size. For example, a recess of the same size (in terms of area) can be provided after each pin. The length of a pin in the longitudinal direction of a comb can preferably be a multiple (in particular between 1 and 3) of a length (in the longitudinal direction of the comb) of a light source arranged in a light source arrangement. The length (in the longitudinal direction of the comb) of a recess located between two pins can (always) correspond to the length of a pin.

In particular, a respective pin can comprise a light coupling surface into which the light of an associated light source can be coupled. For example, the light coupling surface can be flat and have a rectangular cross-section. In particular, the base surface of the recess can have the same cross-section (with the same size) as the light coupling surface. It shall be understood that in variants of the application, the light coupling surface can also have a different cross-sectional shape, for example, a circular or oval cross-sectional shape.

According to a preferred embodiment of the barrier element composite according to the application, in a connected state of the first barrier element and the second barrier element, the first pins can be arranged offset to the second pins. In particular, this means that no second pin is arranged directly adjacent to a first pin, but rather a recess is arranged between two adjacent pins. With a comb-like arrangement of the first pins and with a comb-like arrangement of the second pins, the first comb with the first pins respectively teeth can be arranged offset to the second comb with the second pins respectively teeth in such a way that a respective first pin is always arranged adjacent to a second recess of the second comb and a second pin is always arranged adjacent to a first recess of the first comb. In this way, the light sources of a light source arrangement can be arranged offset to one another in a corresponding manner so that the required distance between the light source arrangements can be minimized. In a simple and safe manner, it can be ensured, in particular in the case of barrier elements with a small thickness (e.g. between 1 mm and 3 mm) and a thin separation layer (e.g. between 0.15 mm and 0.5 mm), that only light can be coupled into the first barrier element by the at least one first light source arrangement and only light can be coupled into the second barrier element by the at least one second light source arrangement.

According to a further embodiment (in particular, an alternative compared to the previous embodiment) of the barrier element composite according to the application, a first end area with the first side surface of the first barrier element can be deformed (in a connected state of the first barrier element and the second barrier element) with respect to a second end area with the second side surface of the second barrier element in such a way that the distance between the first end area and the second end area is greater than the distance between the second side surface of the first barrier element and the third side surface of the second barrier element (in a connected area respectively in an area which is not the end area). The distance in the end area can be between 3 mm and 10 mm, for example. As already described, the distance in the connected area respectively the thickness of the separation layer can be between 0.15 mm and 0.5 mm, for example. By increasing the distance between the first end area and the second end area by a deformation (for example, bending) (compared to the connected areas, in particular, comprising the at least one light decoupling area), it can be ensured for barrier elements with a small thickness (for example, between 1 mm and 3 mm) that only light can be coupled into the first barrier element by the at least one first light source arrangement and only light can be coupled into the second barrier element by the at least one second light source arrangement.

A further aspect of the application is a barrier element composite set. The barrier element composite set comprises a first barrier element composite described above. The barrier element composite set comprises a second barrier element composite described above. A second side surface of the first barrier element composite, which forms a rear side of the first barrier element composite, is connected to a second side surface of the second barrier element composite, which forms a rear side of the second barrier element composite. An at least partially substantially optically transparent separation layer is arranged between the second side surface of the first barrier element composite and the second side surface of the second barrier element composite.

A barrier element composite set according to the application enables a displaying of information on both sides. In particular, different information (e.g., different color, different symbol, etc.) can be displayed on respectively at the front of the barrier element composite set than on respectively at the rear of the barrier element composite set. The front side of the barrier element composite set can be formed by the third side surface of the first barrier element of the first barrier element composite, and the rear side of the barrier element composite set can be formed by the third side surface of the second barrier element of the second barrier element composite.

The second side surface of a barrier element composite can be the second side surface of a second barrier element. If a barrier element composite comprises three barrier elements, the second side surface of the barrier element composite can be the second side surface of the third barrier element. The same applies to a barrier element composite with four or more stacked barrier elements.

The separation layer can be formed in accordance with the separation layer described above. For example, the separation layer between the aforementioned second side surfaces can be formed by at least one cover layer and one air layer.

A further aspect of the application is a barrier element arrangement of a gate of an access control system. The barrier element arrangement comprises at least one previously described barrier element composite and/or a previously described barrier element composite set. The barrier element arrangement comprises at least one light source device comprising at least one first light source arrangement configured to couple light into the at least one first light coupling area, and comprising at least one second light source arrangement configured to couple light into the at least one second light coupling area.

In particular, the light source device can be arranged such that the at least one first light source arrangement is (optically) connected to the first light coupling area of a first barrier element and that the at least one second light source arrangement is (optically) connected to the second light coupling area of a second barrier element. It shall be understood that a corresponding number of further light source arrangements can be provided if there are more than two barrier elements.

The at least one light source device of the barrier element arrangement comprises in particular at least one light source arrangement, which in turn comprises, in particular, a plurality of identical or different light sources. A light source can be configured to generate light respectively visible electromagnetic radiation. In particular, a light source can be a single-color light-emitting diode (LED) or a multicolor light-emitting diode (LED). A multicolor light-emitting diode can technically be formed by a group of several individually controllable single-color light-emitting diodes (LEDs) that are arranged so close together that (only) one light source that can light with several colors can be perceived externally. Typically, a multicolor light-emitting diode is formed by three single-color light-emitting diodes with the colors red, green, and blue. It shall be understood that other light sources (e.g., gas discharge lamp, laser, etc.) can also be used in other variants of the application.

A light source arrangement of the barrier element arrangement is thus in particular configured to couple light of at least one color into a light coupling area of an associated barrier element, wherein the color emitting of the light source arrangement is controllable, as will be explained further below.

The at least one light source device is arranged, in particular, at an outer side of the barrier element composite respectively of the first barrier element and of the second barrier element in such a way that light generated by a first light source arrangement of the light source device is coupled into the first light coupling area and, in particular, light additionally generated by a second light source arrangement of the light source device is coupled into the respective barrier element at the second light coupling area.

According to a further embodiment of the barrier element arrangement according to the application, the light source device can comprise an optically non-transparent encapsulation. An optically non-transparent encapsulation means, in particular, that the light sources of the light source device are surrounded by a light-tight housing. The encapsulation is preferably arranged in such a way that the light generated by the light source device, in particular by the light sources integrated therein, is only coupled into the first light coupling area and/or the second light coupling area. In other words, the light sources are preferably completely surrounded by the encapsulation and the barrier element composite (respectively the respective first side surfaces of the barrier elements).

In particular, the encapsulation can be made of metal. For example, the encapsulation can be formed from a metal sheet. It shall be understood that other light-tight materials can also be used in other variants of the application.

Preferably, the encapsulation respectively the housing can have a U-shaped cross-section. The first side surface with the first light coupling area of the first barrier element and/or the first side surface with the second light coupling area of the second barrier element can be arranged at the open side of the U-shaped cross-section. In other words, the open side of the U-shaped cross-section can be (completely) closed by the at least two first side surfaces of the barrier element composite.

The preferably complete encapsulation of the plurality of light sources of the light source device can prevent extraneous light from being coupled into a light coupling area.

According to a further embodiment of the barrier element arrangement according to the application, the light source device can comprise at least one first light source arrangement. The at least one first light source arrangement can be configured to generate light in a first light wavelength range. The light source device may comprise at least one second light source arrangement. The at least one second light source arrangement can be configured to generate light in a second light wavelength range that differs from the first light wavelength range. In particular, the first and second light source arrangements can be controllable with respect to the generated light colors so that the first light source arrangement and the second light source arrangement can generate identical, different, or temporally alternating colors.

According to a particularly preferred embodiment of a barrier element arrangement according to the application, the at least one first light source arrangement can be arranged in the light source device in such a way that the generated light is only coupled into the at least one first light coupling area. In other words, the at least one first light source arrangement couples the light generated by it only into the first barrier element. The at least one second light source arrangement may be arranged in the light source device such that the generated light is only coupled into the at least one second light coupling area. In other words, the at least one second light source arrangement couples the light generated by it only into the second barrier element. According to the above example, for example, red light can only be coupled into the first barrier element and green light only into the second barrier element. In variants of the application, light of the same color can alternatively or additionally be coupled into the first barrier element and the second barrier element. In a corresponding manner, at least one third light source arrangement can be provided for a third barrier element.

As already described, the light source device can preferably comprise an encapsulation. Preferably, an optically non-transparent source separation layer can be arranged between the at least one first light source arrangement and the at least one second light source arrangement. In particular, the source separation layer can be part of the encapsulation. The source separation layer can divide the encapsulation in a first partial encapsulation and a second partial encapsulation. Preferably, the at least one first light source arrangement can be arranged (only) in the first partial encapsulation and the at least one second light source arrangement can be arranged (only) in the second partial encapsulation.

The source separation layer (preferably also formed by metal, such as a metal sheet) can, in particular, be arranged in such a way that no light from the first (respectively the second) light source arrangement can pass from the first partial encapsulation (respectively the second partial encapsulation) into the second partial encapsulation (respectively the first partial encapsulation) in the light source device.

Furthermore, a partial encapsulation of the first light source arrangement respectively second light source arrangement means that scattered light can be prevented from entering the other barrier element by exceeding the critical angle. In particular, a respective partial encapsulation can provide a light propagation predominantly orthogonal to the surface of the respective light coupling area.

Optionally, the at least one light source device can comprise at least one focusing module downstream of the at least one light source arrangement. For example, a lens can be connected downstream of the at least one light source arrangement as a focusing module. This allows the generated light to be coupled into a barrier element in an even more focused manner. This can (again) ensure that the light coupled into a barrier element is reflected at the respective boundary surfaces of the barrier element. In particular, the light can be coupled in such a focused manner that the light is reflected at the boundary surfaces of the barrier element and cannot diffuse into an adjacent medium (such as the environment, in particular air, or the other barrier element). In particular, only light that hits a light decoupling area can be decoupled (at least if the described reflective layer is also provided).

Preferably, focusing by means of the encapsulation and source separation layer (optionally by the at least one focusing module) can achieve that the angle of incidence $\varphi_E$ of the light propagating in a barrier element at the (optical) separation layer is (always) greater than the total reflection critical angle $\varphi_G$ at the separation layer. In particular, the following relationship (a) applies to the total reflection critical angle $\varphi_G$:

$$\varphi_G = \arcsin(n_{TS}/n_{SK}), \tag{a}$$

wherein $n_{TS}$ is the interface refractive index and $n_{SK}$ is the (first or second) barrier element refractive index. Here, as described, $n_{SK} > n_{TS}$ applies. In a particularly preferred embodiment with a barrier element made of acrylic glass or polycarbonate and a polymer separation layer and/or an air separation layer, in particular, the following values result:

$n_{SK} \sim 1.5 \ldots 1.58$ (acrylic glass, polycarbonate)
$n_{TS} \sim 1.45$ (polymer foil)
$n_{TS} \sim 1$ (air)
$\varphi_G \sim 65°$ to $75°$ (polymer foil)
$\varphi_G \sim 40°$ (air separation layer respectively air gap).

Since the barrier composite may be surrounded by air in practice, the total reflection critical angle $\varphi_G$ at these interfaces is also $\varphi_G \sim 40°$.

According to a further embodiment of the barrier element arrangement according to the application, the at least one light source arrangement of the light source device can be controllable. Preferably, all light source arrangements of the light source device can be controllable. This means, in particular, that a light source of a light source arrangement is at least be activatable and deactivatable depending on a control signal that is based on and/or contains a command data set. In particular, this also means that in the case of light source arrangements with light sources of different colors, the light sources of different colors can be controlled differently and/or in the case of light source arrangements with multicolor LEDs, the activated colors of the multicolor LEDs can be controlled. The perceptible effect can thus be achieved that a light source arrangement controllably couples differently colored light into the light coupling area of an associated barrier element. It shall be understood that other changeable variables of the light generation of the light sources of a light source arrangement can also be controllable respectively adjustable, for example, the brightness.

In particular, controllability makes it possible for only the at least one first light source arrangement to be activated while the at least one second light source arrangement is deactivated, or only the at least one second light source arrangement can be activated while the at least one first light source arrangement is deactivated or the first light source arrangement and the second light source arrangement are deactivated or are activated.

In particular, the light source arrangements can be activated depending on the current operating state of the access barrier and/or a (predetermined) timing control sequence pattern. If, for example, the access barrier is in a failure respectively non-use state due to a defect, for example, of the actuator for moving the barrier element arrangement, the light source arrangements can be controlled according to a timing control sequence pattern corresponding to this operating state in such a way that, for example, a red cross lights up on the third side surface.

According to a further preferred embodiment of the barrier element arrangement according to the application, the barrier element arrangement can comprise a substantially transparent barrier element panel with a barrier element composite recess located between a first outer panel and a second outer panel. An inner shape of the barrier element composite recess may correspond to an outer shape of the barrier element composite and/or the barrier element composite set such that the barrier element composite can be inserted (precisely) into the barrier element composite recess. As has been described, the size of the flat sides of a barrier element composite can correspond to the size of the symbol respectively the correspondingly shaped light decoupling area to be displayed respectively illuminated. Preferably, in the case of a panel-shaped barrier element composite with flat sides that are essentially rectangular, a respective side length can be between 200 mm and 250 mm. This significantly reduces light losses. In order to nevertheless provide a gate with a barrier element with a (significantly) larger surface area, the barrier element composite can be inserted, in particular, in a barrier element panel (with the corresponding larger dimensions). The barrier element panel can have a length of preferably between 30 cm and 120 cm and a width of between 20 cm and 80 cm.

A barrier element panel comprises two outer panels and is, in particular, of sandwich construction. The barrier element panel can comprise a (circumferential) (essentially transparent) spacer element arranged in an edge area on at least two narrow sides of the barrier element panel between the first outer panel and the second outer panel. In particular, the aforementioned elements can be bonded together and preferably form the composite barrier element recess. The thickness of the spacer element can essentially correspond to the thickness of the barrier element composite. In particular, the barrier element composite recess can be formed in the form of a pocket in the barrier element panel, into which the barrier element composite can be inserted with a precise fit. A further advantage of a barrier element panel with two outer panels is that the outer sides of the barrier element composite and/or the barrier element composite set are protected from damage, in particular, in the form of scratches. In particular, it has been established that damage, such as scratches in a third side surface, leads to unwanted light extraction. This can be safely prevented by the outer panels.

The barrier element panel can, in particular, be made of polycarbonate. Preferably, a further essentially optically transparent separation layer (as described above, for example) can be provided between the barrier element composite and/or the barrier element composite set and the outer panels and/or the spacer element. If the barrier element composite and/or the barrier element composite set comprise/s at least one reflective layer, an optical separation layer can be dispensed with at the corresponding locations, respectively the reflective layer forms the optical separation layer. In addition, a reflective layer ensures that no light escapes unintentionally at a narrow side of the barrier element composite and/or barrier element composite set, as has been described.

A further aspect of the application is a gate of an access control system. The gate comprises at least one base. The gate comprises at least one barrier element arrangement movably attached to the base between an open position and a closed position, as described above.

In particular, the base can be formed by at least one base body (e.g., formed like a column). At least one previously described barrier element arrangement can be attached to the base. The gate can comprise at least one (controllable) actuator (e.g., an electric motor) configured to move the barrier element arrangement between the open position and the closed position of the gate. In the open position, the passage through the gate is released. In the closed position, the passage is (physically) blocked by the barrier element arrangement of the gate.

In particular, the gate can be arranged at an entrance and/or exit of a controlled area. The controlled area may, in particular, require a user to have an access authorization respectively residence authorization for access respectively residence. In particular, the access barrier according to the application can be used in a public transportation access control system, but also in other access applications.

In order to check an authorization of a user to pass through the gate, the gate can, according to one embodiment of the gate according to the application, comprise at least one interface equipment. The interface equipment can be configured to receive an access authorization of a user. The access barrier can comprise at least one release equipment. The release equipment can be configured to release the gate based on a verification of the received access authorization, in particular, based on the result of the verification of the received access authorization.

As already described, an access authorization can be evaluated by an evaluation module (in a conventional manner). The evaluation module can be integrated in the access barrier or in a backend system of the access control system. In particular, the received access authorization can be compared with stored permitted access authorizations or non-permitted access authorizations.

If the evaluation indicates that the user is authorized to pass through the access barrier, the evaluation module can generate a release signal and, in particular, transmit it to the release equipment. When the release signal is received, the release equipment can activate the actuator of the access barrier with a corresponding activation signal. The gate arrangement can be moved to the open position so that the user can pass through the access barrier. If the evaluation indicates that the user is not authorized to pass through the access barrier, the access barrier can remain blocked.

Preferably, the access control system can comprise at least one access barrier and at least one backend system (e.g., formed by at least one server) communicatively coupled with the access barrier. For example, the evaluation module can be integrated in the backend system remotely located from the access barrier. Furthermore, the access control system may comprise an access medium, as described above.

According to a particularly preferred embodiment of the access control system according to the application, the access control system can comprise at least one light source controller. The light source controller can be configured to control the light source device based on at least one predetermined timing control sequence pattern. The timing control sequence pattern can specify at least a first activation start time and a first activation time duration of the first light source arrangement as well as a second activation start time, a second activation time duration of the second light source arrangement and a repetition criterion. Optionally, a brightness to be set or similar can also be predefined. A timing control sequence pattern can define, in particular, a repetitive (defined by the repetition criterion) playback of a symbol sequence visible on the third side surface of the first barrier element (in particular, in the form of a running light). In other words, the light coupling into the at least two barrier elements can be synchronized respectively controlled in time by the light controller. For example, the first light source arrangement and the second light source arrangement can be switched on respectively off with a time offset respectively simultaneously, defined by the at least one timing control sequence pattern. The repetition criterion can define a time period after which an activation pattern is applied again. This can further improve the informative value of symbols and/or colors.

According to a further embodiment of the gate device according to the application, at least one first timing control sequence pattern and at least one second timing control sequence pattern which differs from the first timing control sequence pattern can be predefined. The light source controller may be configured to select one of the stored timing control sequence patterns based on an operational state of the gate device.

According to a further embodiment of the gate device according to the application, the timing control sequence pattern can predetermine a first color code for the first activation start time of the first light source arrangement and a second color code for the second activation start time of the second light source arrangement. In particular, the color code determines the color with which a light source arrangement to be activated is activated at the respective activation start time.

According to a preferred embodiment of the gate device according to the application, the gate device can comprise at least one detection module. The detection module can be configured to detect a (current) operating state of the access barrier. The access barrier can comprise at least one light source controller. The light source controller can be configured to control the light source device based on the detected operating state of the access barrier. In particular, a timing control sequence pattern may be selected from a plurality of predetermined timing control sequence patterns depending on the detected operating state.

As already described, a gate device can take different (predefined) operating states respectively be set to these by a corresponding state control signal. In particular, the detection module can detect the current operating state, for example, by the detection module being configured to receive and evaluate the state control signal.

Exemplary and non-exhaustive examples of (predefinable) operating states are a first passage direction state (passage only possible in a first direction and blocked in the opposite direction), a second passage direction state (passage only possible in the opposite direction and blocked in the first direction), a third passage direction state (passage possible in both directions), a blocking state, a validation state (release of the gate, for example, due to a positive verification of a user's access authorization), a failure state and a maintenance state. A timing control sequence pattern can be assigned to each of these operating states.

In particular, the validation state can also be combined with one of the three passage direction states, i.e., the gate is operated to release, for example, due to a positive verification of an access authorization of a user, wherein the user is only offered the verification of the access authorization in the first passage direction (and not another user in the opposite direction), or wherein the user is offered a verification of access authorization exclusively in the opposite direction (and another user is not offered a verification in the first direction of passage), or wherein two users are offered verification of their respective access authorization in both directions of passage, and wherein the gate opens in the corresponding direction of passage for the user whose access authorization was verified positively first.

The detection module can be integrated in the light source controller. The light source controller is configured to control the controllable light sources of the light source device. Preferably, an assignment table (or the like) can be stored in the light source controller. In the assignment table, a command data set in the form of a predetermined timing control sequence pattern can be assigned (in a unique manner) to each operating state of the gate.

In a further embodiment, the assignment table (or the like) may be stored in a data memory external to the gate such that the light source controller can access the stored command data sets via a data network. In this embodiment, the assignment table can, for example, be stored in a data memory of a computer unit for controlling a series of gates arranged next to each other (gate array) or in a computer unit for controlling several gate arrays at a stop or a station or in a remotely arranged central computer unit, such as a back-end system and/or cloud computer system.

Based on the detected operational state, the light source controller can determine the associated timing control sequence pattern and, in particular, control the light source device with a command data set according to the determined timing control sequence pattern.

A still further aspect of the application is a method of operating a previously described gate device, comprising:
controlling, by a light source controller, the light source device of the barrier element arrangement based on a timing control sequence pattern,
wherein the timing control sequence pattern specifies at least a first activation start time and a first activation time duration of the first light source device, a second activation start time and a second activation time duration of the second light source device, and a repetition criterion.

In particular, the method may comprise detecting an operating state of the gate device and selecting a timing control sequence pattern from at least two different timing control sequence patterns based on the detected operating state. Then, the light source device can be controlled respectively operated according to the selected respectively determined timing control sequence pattern.

Further, the method for operating a previously described gate device may comprise that the timing control sequence pattern specifies a first color code for the first activation start time of the first light source arrangement and a second color code for the second activation start time of the second light source arrangement. In particular, the color code determines the color with which a light source arrangement to be activated is activated at the respective activation start time.

This ensures that light source arrangements that can controllably generate differently colored light can also be controlled accordingly.

A module, equipment, device, etc. described above may comprise at least some hardware elements (e.g., processor, memory means, etc.) and/or at least some software elements (e.g., executable code). It should also be noted that terms such as "first"; "second", "further" etc. do not indicate an order, but serve in particular to distinguish between two elements (e.g., barrier element, light source arrangement, side surface, area etc.).

The features of the barrier element composites, barrier element composite sets, barrier element arrangements, gates, methods and access control systems can be freely combined with one another. In particular, features of the description and/or the dependent claims can be inventive in their own right, even by completely or partially bypassing features of the independent claims, either on their own or freely combined with one another.

BRIEF DESCRIPTION OF THE DRAWINGS

There is now a large number of possibilities for designing and further developing the barrier element composite according to the application, the barrier element composite set according to the application, the barrier element arrangement according to the application, the gate according to the application, the access control system according to the application and the method according to the application. For this purpose, reference is made, on the one hand, to the patent claims following the independent patent claims and, on the other hand, to the description of embodiments in conjunction with the drawing. The drawings show:

FIG. 1a a schematic (sectional) view of an embodiment of a barrier element composite according to the present application, wherein FIG. 1a corresponds, in particular, to the section A-A in FIG. 1b, FIG. 1b a further schematic (front) view of the embodiment according to FIG. 1a, FIG. 2 a schematic view of an embodiment of a barrier element arrangement according to the present application, FIG. 3 schematic views of a further embodiment of a barrier element arrangement according to the present application, FIG. 4 schematic views of a further embodiment of a barrier element arrangement according to the present application in different lighting conditions, FIG. 5 schematic views of a further embodiment of a barrier element arrangement according to the present application in different lighting conditions, FIG. 6 a schematic view of an embodiment of a barrier element composite set according to the present application, FIG. 7a a schematic view of a further embodiment of a barrier element composite according to the present application, FIG. 7b a further schematic view of the embodiment according to FIG. 7a, FIG. 8a a schematic view of a further embodiment of a barrier element arrangement according to the present application, FIG. 8b a further schematic view of the embodiment according to FIG. 8a, FIG. 9 a schematic view of an example of two barrier elements of a barrier element arrangement with a plurality of light sources, FIG. 10a schematic views of a further embodiment of a barrier element composite according to the present application, FIG. 10b a further schematic view of the embodiment according to FIG. 10a, FIG. 11 a schematic view of a further embodiment of a barrier element composite according to the present application, FIG. 12 a schematic view of a further embodiment of a barrier element composite according to the present application, FIG. 13 a schematic view of a further embodiment of a barrier element composite according to the present application, FIG. 14 a schematic view of an embodiment of an access control system according to the present application with an embodiment of a gate according to the present application, and FIG. 15 a diagram of an embodiment of a method according to the present application.

In the following, similar reference signs are used for similar elements.

DETAILED DESCRIPTION OF SPECIFIC EMBODIMENTS

Figure 2:
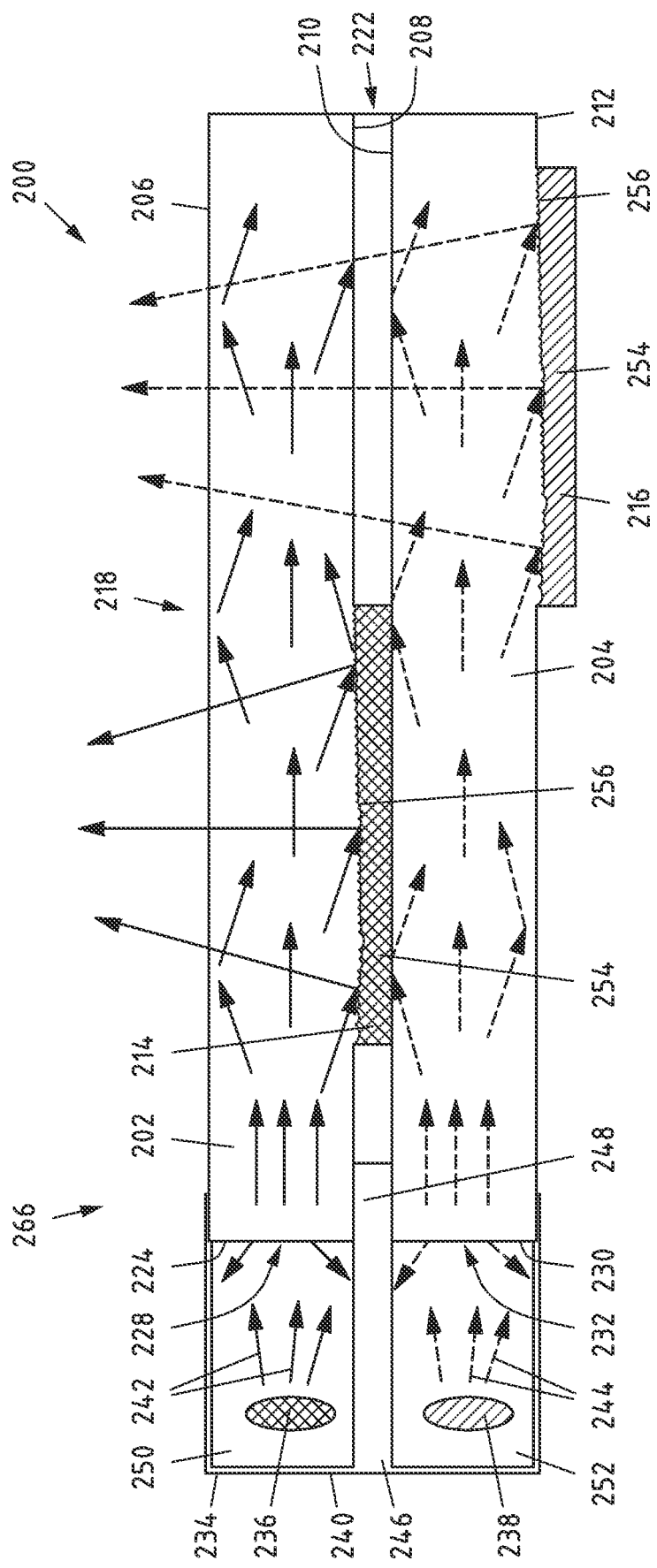

FIGS. 1a and 1b show different schematic views of an embodiment of a barrier element composite 100 according to the present application. In particular, FIG. 1a shows the sectional view A-A of FIG. 1b, and FIG. 1b shows a front view.

The barrier element composite 100 is, in particular, a component of a (not shown) barrier element arrangement or forms the barrier element arrangement of a gate of an access control system. The barrier element arrangement is used as a physical blocking element in a gate.

In particular, the barrier element composite 100 is a substantially optically transparent barrier element composite 100. The barrier element composite 100 comprises at least a first barrier element 102 and a second barrier element 104, each of which is substantially optically transparent. For example, the barrier elements 102, 104 may be made of acrylic glass and/or polymer carbonate.

The first barrier element 102 comprises a first side surface 124 having a first light coupling area 128, a second side surface 108 having at least one first light decoupling area 114 and a third side surface 106 forming a visible surface 118 of the barrier element composite 100 and lying opposite the second side surface 108. The second barrier element 104 can, in particular, be formed identically to the first barrier element 102. The second barrier element 104 comprises a first side surface 130 having a second light coupling area 132, a second side surface 112 having at least one second light decoupling area 116 and a third side surface 110 lying opposite the second side surface 112.

As can be seen from FIGS. 1a and 1b, the first barrier element 102 and the second barrier element 104 are preferably formed in the shape of a plate respectively disk. The outline of a barrier element 102, 104 may be substantially rectangular (as shown, for example, corners may be rounded). A first side surface 124, 130 may preferably be a first narrow side. A second side surface 108, 112 may preferably be a first flat side. And a third side surface 106, 110 may be the further flat side opposite the first flat side. Furthermore, a barrier element composite 100 can comprise further narrow sides 126.1, 126.2, 126.3.

The at least two barrier elements 102, 104 are connected to each other. In particular, the at least two barrier elements 102, 104 can be bonded together at least in sections. It shall be understood that other types of connection can also be used in variants of the application.

According to the application, the third side surface 110 of the second barrier element 104 is connected to the second side surface 108 of the first barrier element 102. Preferably, the first light decoupling area 114 (described in more detail below) may comprise a non-transparent cover layer that is adhesive on both sides. For example, the cover layer may be coated on both sides with an optically transparent adhesive. In a simple manner, the barrier elements 102, 104 may be joined together by the cover layer (provided in any case) to form the barrier element composite 100.

A separation layer 122 is arranged between the first barrier element 102 and the second barrier element 104. The separation layer 122 is at least a partially optically transparent separation layer 122. In the preferred embodiment shown, the separation layer 122 is at least partially formed by means of the non-transparent cover layer and a (transparent) air layer disposed adjacent to the cover layer.

A separation layer refractive index $n_{TS}$ of the separation layer 122 can be at least smaller than a first barrier element refractive index $n_{SK1}$ of the first barrier element 102 and a second barrier element refractive index $n_{SK2}$ of the second barrier element 104. In this way, it can be achieved that the barrier element composite 100 is essentially optically transparent, but at the same time an optical separation between the first barrier element 102 and the second barrier element 104 is provided by the separation layer 122. Thus, the separation layer 122 according to the application can prevent light that is coupled into the first barrier element 102 by means of the first light coupling area 128 and substantially orthogonal to the first side surface 124 from entering into the second barrier element 104. It can also be ensured that light that is coupled into the second barrier element 104 by means of the second light coupling area 132 and substantially orthogonal to the first side surface 130 can only enter into the first barrier element 102 if it is deflected by the second light decoupling area 116, i.e., has impinged on it. The remaining light cannot enter into the first barrier element 102.

According to the application, light decoupled by the first light decoupling area 114 and the second light decoupling area 116 is visible at the third side surface 106 of the first barrier element 102. In particular, the third side surface 106 of the first barrier element 102 forms the front side and comprises the visible surface 118 of the entire barrier element composite 100. Light that is coupled into the first barrier element 102 is deflected by means of the first light decoupling area 114 and leaves at the third side surface 106 of the first barrier element 102. In particular, a user located at the front can see a luminous surface that corresponds to the shape respectively outline of the first light decoupling area 114. Light that is coupled into the second barrier element 104 is deflected by means of the second light decoupling area 116 and leaves at the third side surface 110 of the second barrier element 104, penetrates the air respectively the air layer, then penetrates the first barrier element 102 and leaves again at the third side surface 106 of the first barrier element 102. In particular, a user located at the front can see a luminous surface that corresponds to the shape respectively outline of the second light decoupling area 116. If light is simultaneously coupled into the first barrier element 102 and the second barrier element 104, a luminous surface is visible to a user located at the front side, which, in particular, corresponds to the shape respectively outline of the first light decoupling area 114 and the second light decoupling area 116. In particular, said light decoupling areas 114, 116 can be arranged offset to one another in such a way that a luminous surface is visible to a user located at the front, which, in particular, corresponds to the shape respectively outline of the first light decoupling area 114 and the second light decoupling area 116.

FIG. 2 shows a schematic (sectional) view of an embodiment of a barrier element arrangement 266 according to the present application with an embodiment of a barrier element composite 200 according to the present application. In order to avoid repetitions, essentially only the differences to the embodiment according to FIGS. 1a and 1b are described below, and reference is otherwise made to the previous explanations. FIG. 2 serves, in particular, to explain in more detail the mode of operation of a barrier element arrangement 266 according to the present application.

The barrier element arrangement 266 comprises a light source device 234. The illustrated light source device 234 comprises at least one first light source arrangement 236, in particular, formed by a plurality of first light sources, and at least one second light source arrangement 238, in particular, formed by a plurality of second light sources. A light source can be formed in the form of a single-color or multi-color LED. A light source can generate light in a single color or controllably in a plurality of colors so that the respective light source arrangement 236, 238 generates light that can be perceived as exclusively single-color or controllably in different colors.

The light source device 234 is configured to couple light into the first light coupling area 228, which is formed, in particular, by the entire first side surface 224 of the first barrier element 202, and to couple light into the second light coupling area 232, which is formed, in particular, by the entire first side surface 230 of the second barrier element 204.

As can be seen, the light source device 234 is arranged on a narrow side respectively an edge of the first barrier element 202 and, in particular, also of the second barrier element 204. In particular, this respective narrow side respectively the first side surfaces 224, 230 essentially form the respective light coupling areas 228, 232.

As can be seen, the light source device 234 is arranged on a narrow side of the barrier element composite 200. The illustrated light source device 234 comprises an optically non-transparent encapsulation 240 respectively housing. In other words, light cannot pass through the encapsulation 240. For example, the encapsulation 240 may be made of metal or other opaque material.

The encapsulation 240 is preferably arranged such that the light 242, 244 (indicated by the arrows) generated by the light source device 234, in particular, by the light source arrangements 236, 238, is only coupled into the first light coupling area 228 and the second light coupling area 232. In other words, the at least two light source arrangements 236, 238 are in the present case completely surrounded respectively encapsulated by the encapsulation 240 and the barrier elements 202, 204, i.e., in particular, the first side surfaces 224, 230 of the barrier elements 202, 204. As can be seen, the encapsulation 240 comprises, in particular, a U-shaped cross-section for this purpose.

Furthermore, an optically non-transparent source separation layer 246 made of a light-impermeable material (e.g., metal) is arranged in the light source device 234 between the at least one first light source arrangement 236 and the at least one second light source arrangement 238. The source separation layer 246 extends from an inner wall of the encapsulation 240 to at least the first barrier element 202 and the second barrier element 204, respectively. Preferably, one end of the source separation layer 246 may extend into a gap 248 between the first barrier element 202 and the second barrier element 204. This end of the source separation layer 246 may be followed by the optically transparent separation layer 222.

In particular, the source separation layer 246 may be part of the encapsulation 240 and preferably made of the same material as the encapsulation 240. A first partial encapsulation 250 and a second partial encapsulation 252 are provided by the source separation layer 246 in the present embodiment.

In particular, the at least one first light source arrangement 236 is arranged only in the first partial encapsulation 250, and the at least one second light source arrangement 238 is arranged only in the second partial encapsulation 252. A partial encapsulation 250, 252 of the first light source arrangement 236 and the second light source arrangement 238, respectively, in particular, causes light 242, 244 to be scattered into the respective other barrier element 204, 202.

In particular, a respective partial encapsulation 250, 252 can provide a light propagation predominantly orthogonal to the surface of the light coupling area 228, 232. Optionally, the light source device may comprise not shown focusing modules (e.g., lenses), in particular upstream of each light source arrangement, to further focus the generated light 242, 244.

Furthermore, as indicated in FIG. 2 by the arrows (different arrows are intended, in particular, to symbolize light of different wavelengths), the respectively coupled light (in particular, due to the focusing described) propagates substantially orthogonally to the surface of the respective light coupling areas 228, 232.

As can be seen, the light is predominantly reflected at the boundary surfaces of a barrier element 202, 204 in such a way that it does not leave the respective barrier element 202, 204 (except due to scattering by a light decoupling area 214, 216). The reason for this is, in particular, that the refractive index of the surrounding air and/or the separation layer 222 (which may also consist of air) is smaller than the first barrier element refractive index of the first barrier element 202 and the second barrier element refractive index of the second barrier element 204. This is explained in more detail below with the aid of FIG. 3.

Figure 3:
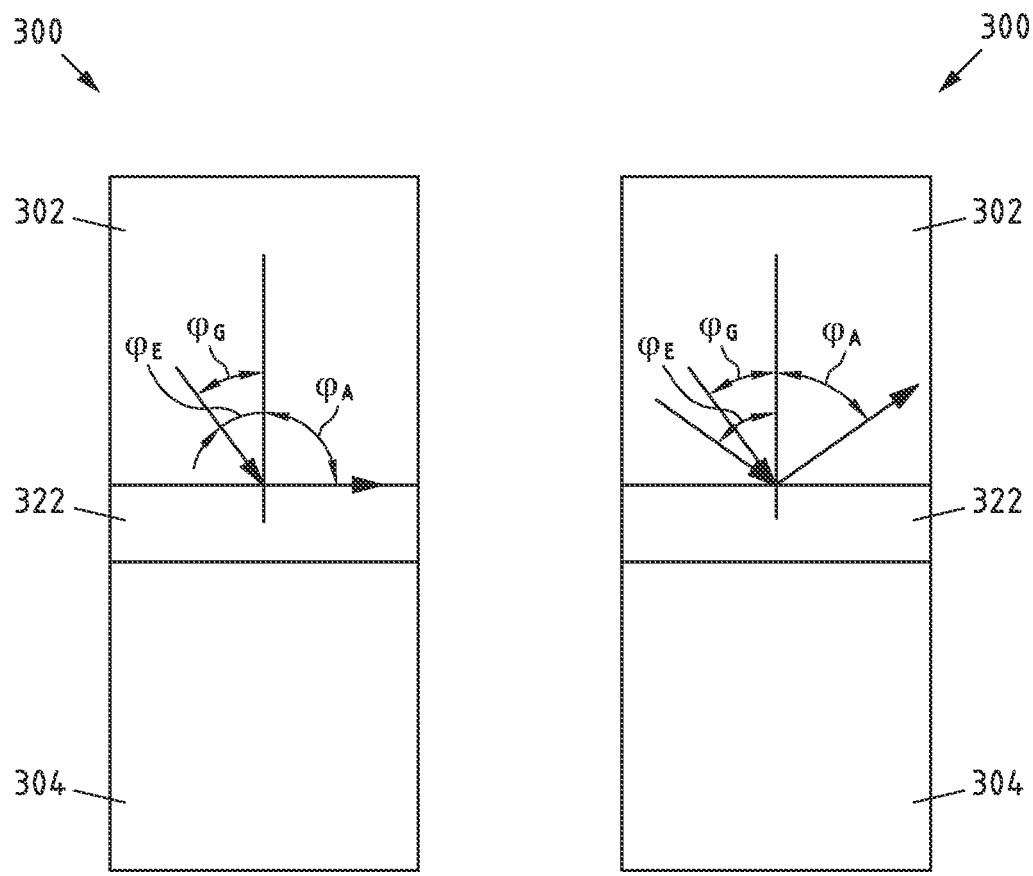

FIG. 3 shows schematic views of a section of a barrier element composite 300 comprising a first barrier element 302 and a second barrier element 304 according to the present application with different angles of incidence of light.

On the left side of FIG. 3 a (border) case (incidence of light at the critical angle) is shown in which the angle of incidence $\varphi_E$ of the light is equal to the critical angle $\varphi_G$. As can be seen, this results in the angle of reflection being $\varphi_A = 90°$. On the right side of FIG. 3, the (normal) case (total internal reflection) is shown, in which the angle of incidence $\varphi_E$ of the light is larger than the critical angle $\varphi_G$. In this case, the light is reflected. In particular, the angle of reflection $\varphi_A$ is equal to the angle of incidence $\varphi_E$. As has already been described, the light source device (in particular, the encapsulation with the source separation layer) can focus the coupled light in such a way that the angle of incidence $\varphi_E$ of the light at the separation layer 306 is (always) larger than the critical angle $\varphi_G$.

As shown in FIG. 2, the second side surface 208 of the first barrier element 202 comprises a first light decoupling area 214, and the second side surface 212 of the second barrier element 204 comprises a second light decoupling area 216. A light decoupling area 214, 216 is formed in the present case by a roughened surface area 256 and by an optically non-transparent cover layer 254 (in particular a (white) cover foil) arranged over the roughened surface area 256. A roughened surface area 256 is, in particular, a partial area of a second side surface 208, 212, which is rougher (in particular, has a greater average roughness value) than the surface of the surrounding surface respectively the further partial area of the second side surface 208, 212 (with a lower average roughness value).

As schematically indicated in FIG. 2, light that hits a light decoupling area 214, 216 is deflected in such a way that it leaves the barrier element composite 200 at the third side surface 206 with the visible surface 218 of the barrier element composite 200. In particular, the roughening 256 in the light decoupling area 214, 216 creates micro surfaces which are tilted relative to the smooth side surfaces 208, 212 in such a way that the incident light is reflected at them in such a way that the light leaves the respective barrier element 202, 204 at the respective third side surface 206, 210 opposite a second side surface 208, 212 (in a defined manner). In addition, in the present embodiment, it may be provided that light can leaves at the side surfaces respectively narrow edges opposite the first side surfaces 224, 230.

Figure 4:
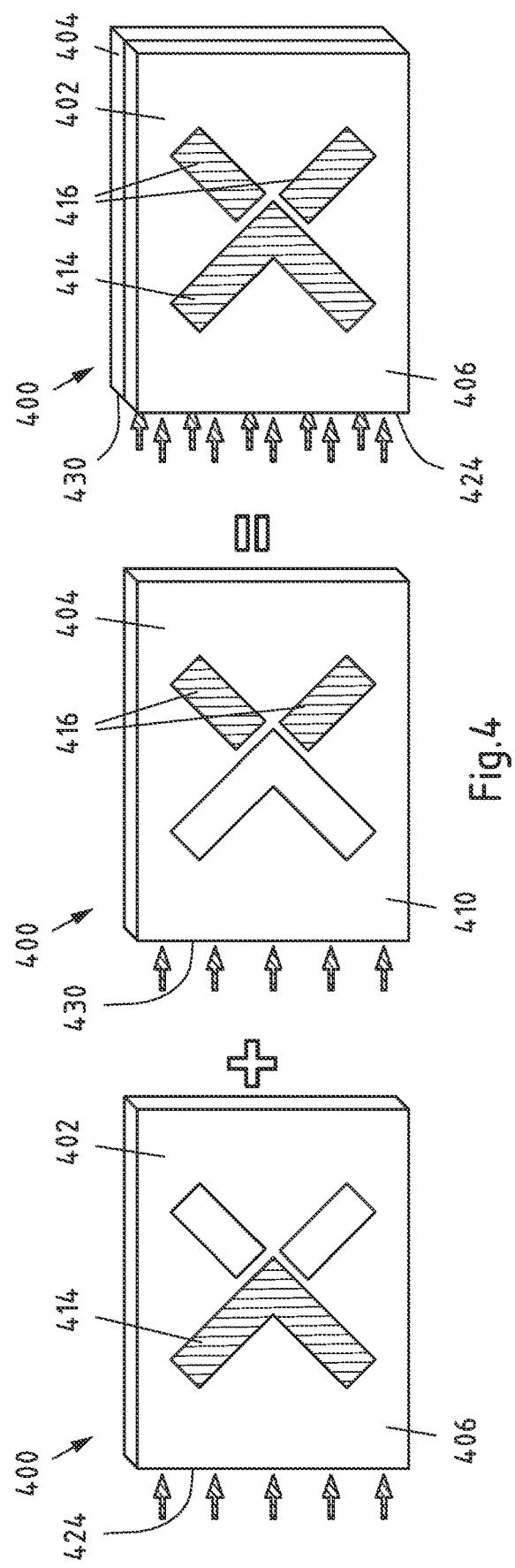

FIG. 4 shows schematic (front) views of a further embodiment of a barrier element composite 400 according to the present application in different illumination states of the barrier element composite. In order to avoid repetitions, essentially only the differences to the previous embodiments are described below, and otherwise reference is made to the previous explanations. For a better overview, only the first barrier element 402 is shown in the left-hand area of FIG. 4 and only the second barrier element 404 is shown in the central area of FIG. 4.

In the present case, the first light decoupling area 414 forms a first symbol shape, in particular, in the form of an arrow respectively an arrowhead. In other words, a partial area of the second side surface of the first barrier element 402 is roughened in particular in accordance with the first symbol shape. When light is coupled into the first side surface 424 of the first barrier element 402, the arrow is visible to a user located in front of the third side surface 406. For example, when green light is coupled in, a green illuminated arrow is visible on the third side surface 406.

In the present case, the second light decoupling area 416 forms a partial symbol shape, in particular, in the form of a partial cross. In other words, a partial area of the second side surface of the second barrier element 404 is roughened, in particular, according to the partial symbol shape. When light is coupled into the first side surface 430 of the second barrier element 404, the partial symbol is visible to a user located in front of the third side surface 410 of the second barrier element 404.

In the right portion of FIG. 4, the barrier element composite 400 is shown in an operational state in which light is coupled into the first barrier element 402 and the second barrier element 404. As shown, in this operational state, a composite symbol shape formed by the first light decoupling area 414 and the second light decoupling area 416 is visible to a user located in front of the third side surface 406. The composite symbol shape in the present case is a cross, which is composed of the arrow and the partial cross. For example, when red light is coupled into the first barrier element 402 and the second barrier element 404, a red illuminated cross is visible on the third side surface 406.

Figure 5:
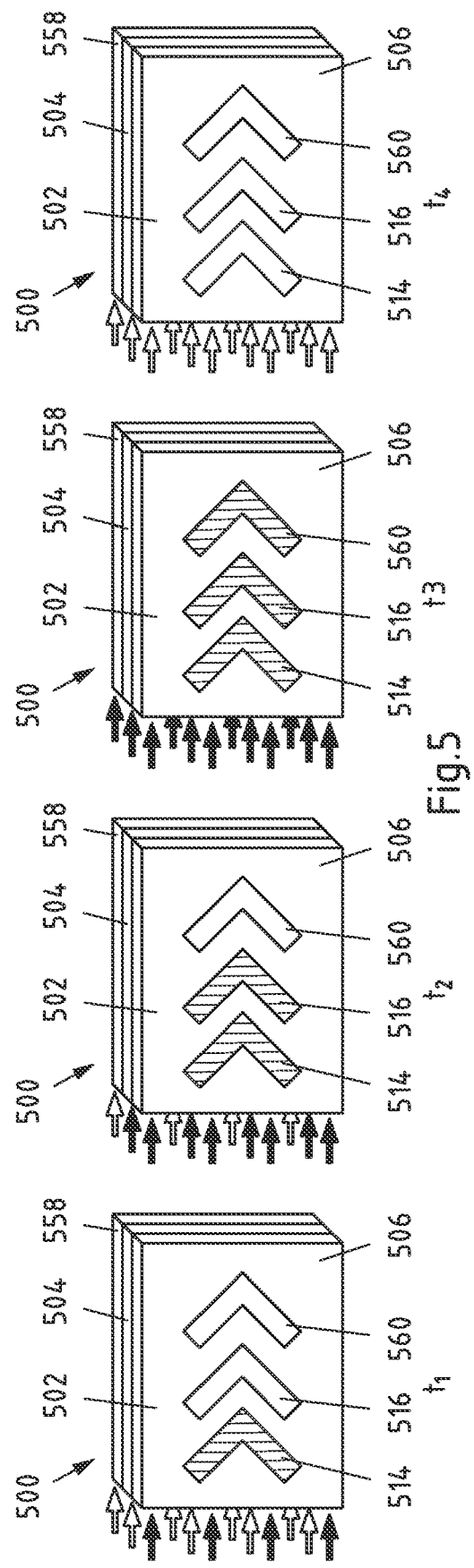

FIG. 5 shows schematic views of a further embodiment of a barrier element composite 500 according to the present application in different illumination states respectively at different operating times $t_1$ to $t_4$. In order to avoid repetitions, the differences to the previous embodiments are essentially described below, and reference is otherwise made to the previous explanations.

As can be seen, the shown barrier element composite 500 comprises a first barrier element 502, a second barrier element 504 and a third barrier element 558. The first barrier element 502 comprises a first light decoupling area 514 on a second side surface, in particular, in the form of a first symbol shape (for example an arrow). The second barrier element 504 has a second light decoupling area 516 on a second side surface, in particular, in the form of a second symbol shape (for example, an arrow). The third barrier element 558 comprises a third light decoupling area 560 on a second side surface, in particular, in the form of a third symbol shape (exemplified by an arrow).

The light source device (not shown for a better overview) of a corresponding barrier element arrangement can comprise at least one first controllable light source arrangement, at least one second controllable light source arrangement and at least one third controllable light source arrangement. The light source arrangements can, in particular, be controlled by a (not shown) light source controller based on a predetermined timing control sequence pattern. The timing control sequence pattern specifies at least a first activation start time, a first activation time duration of the first light source arrangement and a second activation start time and a second activation time duration of the second light source arrangement and a repetition criterion. If the light source arrangements are configured to generate controllably different colored light, then the timing control sequence pattern additionally or alternatively specifies a color code that determines the color with which a light source arrangement to be activated is activated. In the present case, the timing control sequence pattern also specifies at least a third activation start time and a third activation duration of the third light source arrangement.

The following specifications can be defined as examples:
Light source arrangement 1: Activation start time $t_1$, activation time duration $T_1$
Light source arrangement 2: Activation start time $t_2$, activation time duration $T_2$
Light source arrangement 3: Activation start time $t_3$, activation duration $T_3$
Repetition criterion: Duration $T_4$ At the activation start time $t_1$, the at least one first light source arrangement is activated for the activation period $T_1$ (e.g., $T_1=t_4-t_1$). For a user located in front of the third side surface 506 of the first barrier element 502, only the first light decoupling area 514 respectively the first symbol shape in the form of an arrow is visible for a period of time ($t_1$ to $t_2$) in which only the first light source arrangement is activated. At the activation start time $t_2$, the at least one second light source is activated for the activation time period $T_2$ (e.g., $T_2=t_4-t_2$). For a user located in front of the third side surface 506 of the first barrier element 502, only the first light output area 514 and the second light output area 516 are visible for the further time period ($t_2$ to $t_3$) in which only the first light source arrangement and the second light source arrangement are activated, respectively a composite symbol shape (double arrow) formed by the first symbol shape and the second symbol shape is visible. At the activation start time $t_3$, the at least one third light source arrangement is activated for the activation time duration $T_3$ (e.g., $T_3=t_4-t_3$). For a user located in front of the third side surface 506 of the first barrier element 502, the first light decoupling area 514, the second light decoupling area 516 and the third light decoupling area 560 are visible for the further time period ($t_3$ to $t_4$) in which the first light source arrangement, the second light source and the third light source are activated, respectively a composite symbol shape (triple arrow) is visible, which is formed by the first symbol shape, the second symbol shape and the third symbol shape.

At time $t_4$, all light source arrangements are deactivated. In particular, the respective activation period $T_1$, $T_2$, $T_3$ expires at time $t_4$. The time duration $T_4$ can in particular define when the respective light source arrangements are activated again so that the sequence described above is repeated (starting with the activation of the at least one first light source arrangement with the activation time duration $T_1$). In other words, a particularly repetitive playback of a symbol sequence visible on the third side surface of the first barrier element (in particular, in the form of the described running light) can be defined by the timing control sequence pattern.

Figure 6:
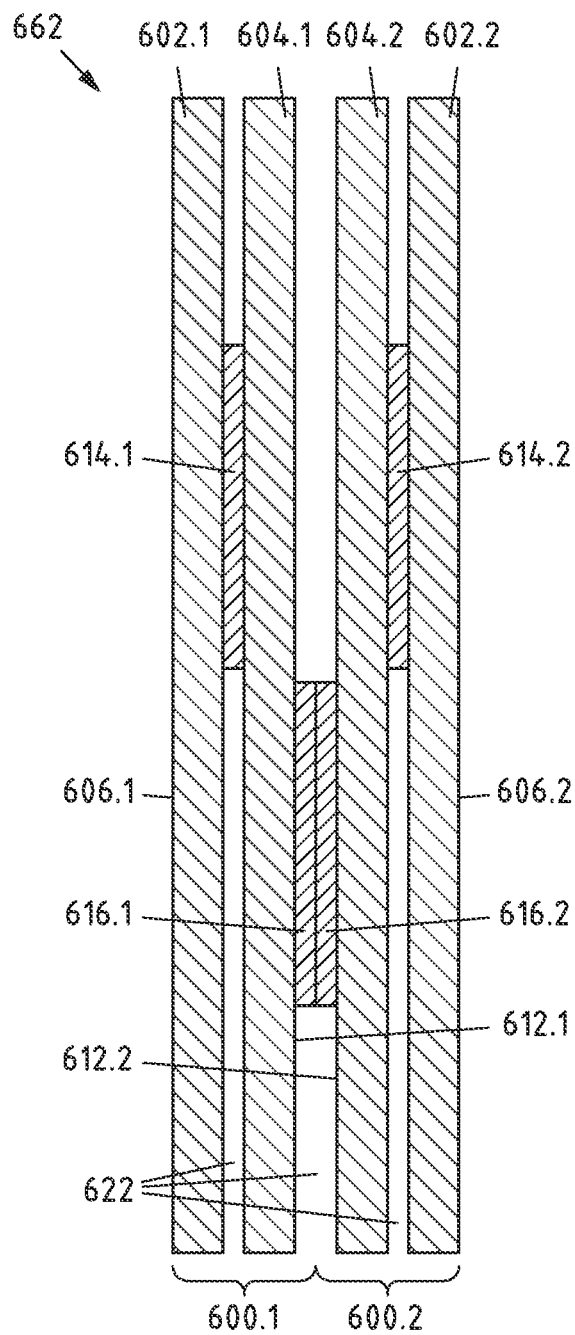

FIG. 6 shows a schematic (sectional) view of an embodiment of a barrier element composite set 662 according to the present application. The barrier element composite set 662 comprises a first barrier element composite 600.1 (e.g., according to FIG. 1) and at least one second barrier element composite 600.2 (e.g., also according to FIG. 1). A second side surface 612.1 of the first barrier element composite 600.1, which forms a rear side of the first barrier element composite 600.1, is connected to a second side surface 612.2 of the second barrier element composite 600.2, which forms a rear side of the second barrier element composite 600.2. The first barrier element composite 600.1 comprises a first light decoupling area 614.1 and a second light decoupling area 616.1. The second barrier element composite 600.2 comprises a further first light decoupling area 614.2 and a further second light decoupling area 616.2. An at least partially optically transparent separation layer 622 is arranged between the second side surface 612.1 of the first barrier element composite 600.1 and the second side surface 612.2 of the second barrier element composite 600.2. In particular, the optically transparent separation layer 622 can be formed by the second light decoupling areas 614.1, 616.2 and by an air layer. The barrier element composite set 662 enables information to be displayed on both sides. In particular, different information (e.g., different color, different (composite) symbol, different running light, etc.) can be displayed on or at the front of the barrier element composite set 662 than on or at the rear of the barrier element composite set 662.

Figure 7A:
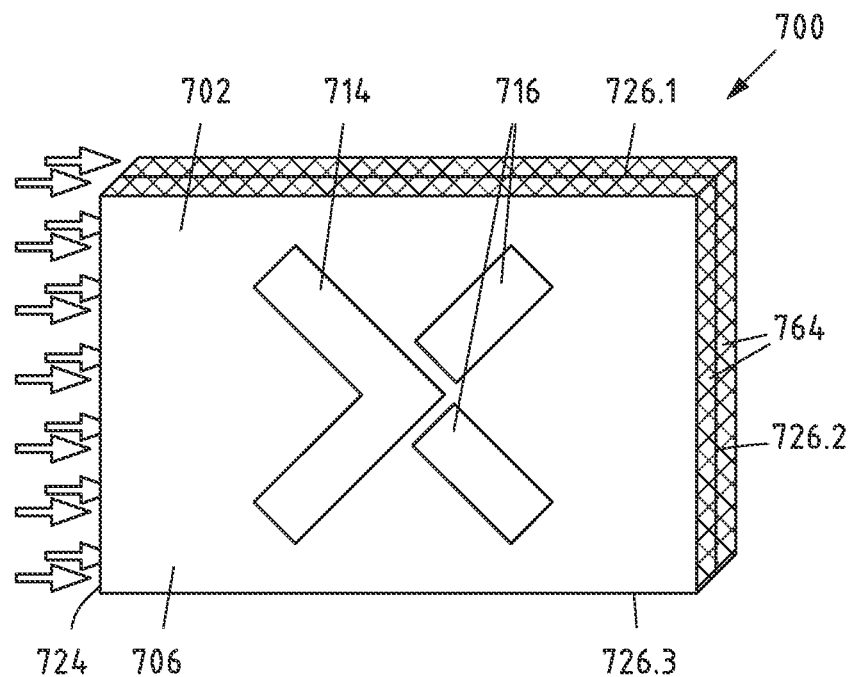
Figure 7B:
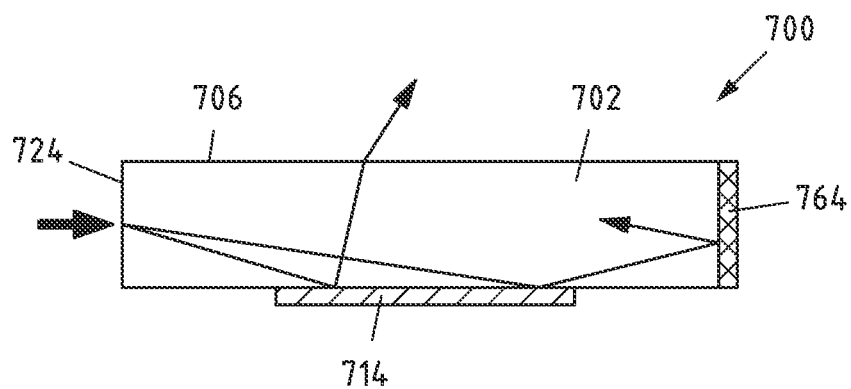

FIGS. 7a and 7b show schematic views of a further embodiment of a barrier element composite 700 according to the present application. In order to avoid repetitions, the differences to the previous embodiments are essentially described below, and reference is otherwise made to the previous explanations.

The shown barrier element composite 700 comprises a first barrier element 702 with a first light decoupling area 714 and a second barrier element (without reference sign) with a second light decoupling area 716 located behind it from the point of view of an observer. A reflective layer 764 is arranged on at least one fourth side surface (in particular, on the three (fourth) narrow sides) of the first barrier element 702 in the present case, and a reflective layer 764 is arranged on at least one fourth side surface (in particular, on the three narrow sides) of the second barrier element 704. In other words, a reflective layer 764 is arranged on all narrow sides 726.1, 726.2, 726.3 of the barrier element composite 700.

As can be seen, in particular, from FIG. 7b (for a better overview, only the first barrier element 702 is shown), light coupled into the first side surface 724 can be reflected by the reflective layer 764. Light losses can be reduced.

Figure 8A:
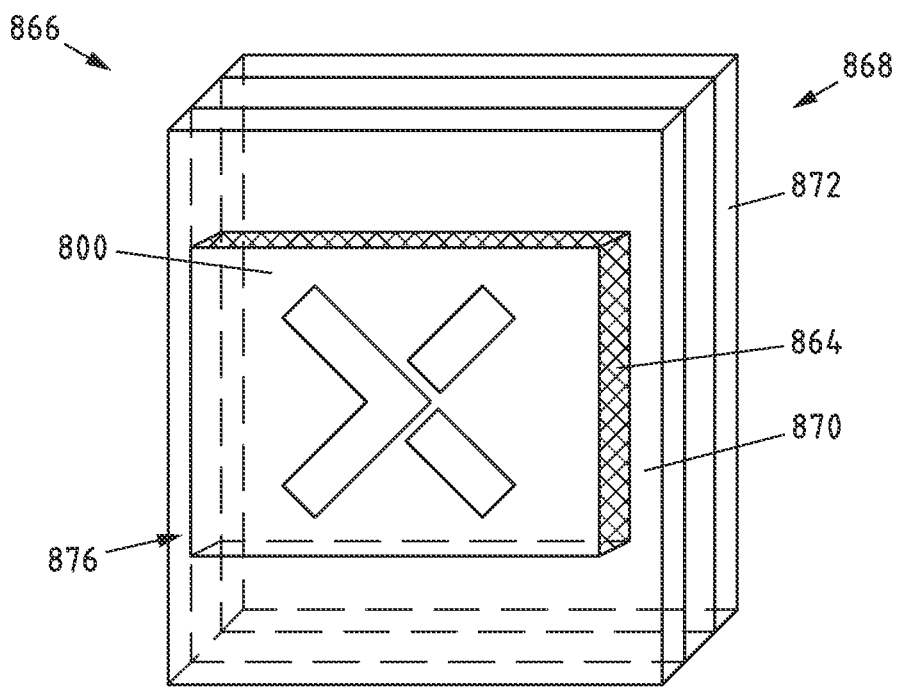
Figure 8B:
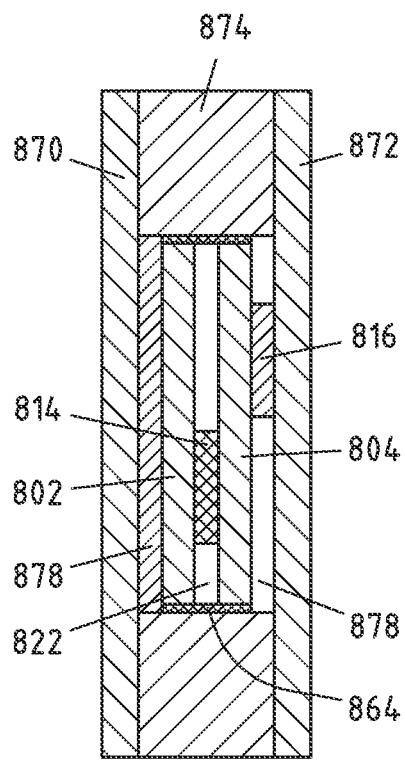

FIGS. 8a and 8b show schematic views of a further embodiment of a barrier element arrangement 866 according to the present application. In order to avoid repetitions, the differences to the previous embodiments are essentially described below, and reference is otherwise made to the previous explanations. Furthermore, a light source device is not shown in order to provide a better overview.

In the present embodiment, the depicted barrier element arrangement 866 comprises a substantially optically transparent barrier element panel 868 with a barrier element composite recess 876 located between a first substantially optically transparent outer panel 870 and a second substantially optically transparent outer panel 872. In an edge area of the barrier element panel 868, a spacer element 874 may be arranged on at least the narrow sides of the barrier element panel 868 between the first outer panel 870 and the second outer panel 872. Outer panels 870, 872 and spacer element may, for example, be formed by acrylic glass and/or polycarbonate and, in particular, may be bonded together with a (transparent) adhesive. As can be seen, the outer panels 870, 872 and the spacer element 874 are joined together, in particular, in such a way that the barrier element composite recess 876 is formed.

An inner shape of the barrier element composite recess 876 can correspond, in particular, to an outer shape of the barrier element composite 800 (e.g., the barrier element composite according to FIG. 7) and/or the barrier element composite set (e.g., according to FIG. 6), such that the barrier element composite respectively the barrier element composite set can be inserted (precisely) into the barrier element composite recess (via the opening in a narrow side). In other words, the barrier element composite recess 876 forms a pocket in the barrier element panel 868 into which a barrier element composite 800 respectively a barrier element composite set (e.g., according to FIG. 6) can be inserted with an accurately fitting. Preferably, a further substantially optically transparent separation layer 878 can be provided between the barrier element composite 800 and the outer panels 870, 872. Preferably, the previously described reflective layer 864 can be arranged between the spacer element 874 and the barrier element composite 800.

Figure 9:
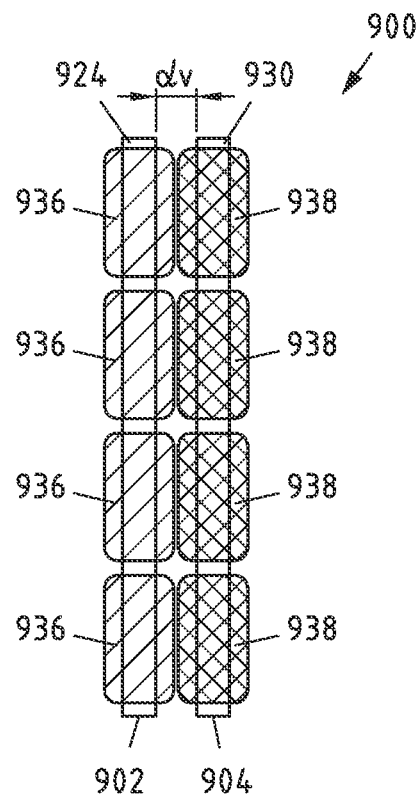

FIG. 9 shows a schematic view of an example of two barrier elements (only the respective first side surfaces 924, 930 are shown for a better overview) of a barrier element composite 900 with a plurality of light sources 936, 938 of a light source device.

For safety reasons, in the case of a gate the kinetic energy with which a barrier element arrangement may be moved (opened and closed) is limited. This results, in particular, from regulations that limit the forces that can occur on a human body in the event of an (unintentional) collision with a moving barrier element arrangement. This means that the speed at which a barrier element arrangement can be moved depends on the mass moment of inertia of the barrier element arrangement respectively is limited by it. The total mass moment of inertia and thus the total weight of the barrier element panel and an inserted barrier element composite must therefore not increase significantly compared to a barrier element arrangement of the prior art. When using multiple barrier elements respectively barrier disks in a barrier element composite, it is therefore preferable to form them as thin as possible. This can result in the desired barrier element thickness being less than the necessary installation width of the respective light source arrangements (e.g. (multicolor) LEDs or groups of diodes with different color emissions with a width and length between approx. 3.5 mm and 5 mm). The distance $\alpha_V$ between the barrier elements required for individual coupling, which is defined by the aforementioned separation layer, would be unnecessarily large. This is shown as an example in FIG. 9. In particular, this would require the use of additional components, which would increase the weight.

The solution to this problem according to a preferred embodiment is shown in FIGS. 10a and 10b. Thus, FIGS. 10a and 10b show schematic views of a further embodiment of a barrier element composite 1000 according to the present application. In order to avoid repetitions, the differences to the previous embodiments are essentially described below, and reference is otherwise made to the previous explanations. Furthermore, a light source device has not been shown in order to provide a better overview.

For a better overview, the first barrier element 1002 and the second barrier element 1004 are shown in FIG. 10a in an unconnected state. The first light coupling area 1028 of the first side surface 1024 of the first barrier element 1002 is formed, in particular, by a first plurality of first pins 1080.1 protruding from the first side surface 1024. In particular, the first side surface 1024 is formed in a comb-like manner. The second light coupling area 1032 of the first side surface 1030 of the second barrier element 1004 is formed, in particular, by a second plurality of second pins 1080.2 protruding from the first side surface 1030. Preferably, the length $l_Z$ of a respective pin 1080.1, 1080.2 substantially corresponds to the length $l_L$ of a light source of a light source arrangement 1036, 1038 (or is minimally greater). Furthermore, the length $l_A$ of a respective recess between two adjacent pins 1080.1, 1080.2 preferably corresponds substantially to the length $l_L$ of a light source of a light source arrangement 1036, 1038 (or is minimally greater). The lengths $l_L$, and $l_A$ can be essentially the same. The width of a light source of a light source arrangement 1036, 1038 and/or of a pin 1080.1, 1080.2 and/or of a recess can essentially correspond to the length of a light source of a light source arrangement 1036, 1038 respectively of a pin 1080.1, 1080.2 respectively of a recess.

In a connected state of the first barrier element 1002 and the second barrier element 1004, the first pins 1080.1 can be arranged offset to the second pins 1080.2. This means in particular that no second pin 1080.1 (and also no further first pin) is arranged adjacent to a first pin 1080.1, but rather a recess is arranged between two adjacent second pins 1080.1. With a comb-like arrangement of the first pins 1080.1 and with a comb-like arrangement of the second pins 1080.2, the first comb with the first pins 1080.1 respectively teeth can be arranged offset relative to the second comb with the second pins 1080.2 respectively teeth in such a way that a respective first pin 1080.1 is always arranged adjacent to a second recess of the second comb and a respective second pin 1080.2 is always arranged adjacent to a first recess of the first comb. In the example of FIG. 10b, each light source of a light source arrangement 1036, 1038 has a greater thickness than the thickness of a pin 1080.1, 1080.2. The respective light sources of a light source arrangement 1036, 1038 can extend over the respective recess between two adjacent pins 1080.1, 1080.2. The light sources 1036, 1038 provided for the barrier elements 1002, 1004 can be set alternately.

As can be seen in particular from FIG. 10b, a corresponding dimensioning of the pins 1080.1, 1080.2 and recesses between the corresponding pins 1080.1, 1080.2 allows that preferably a barrier element composite 1000 with barrier elements with thicknesses in the range from 1 mm to 3 mm and with a distance $\alpha_V$ between the barrier elements of 0.15 mm and 0.5 mm can be used.

FIG. 11 shows a schematic view of a further embodiment of a barrier element composite 1100 according to the present application, in particular, an alternative embodiment to FIG. 10a or 10b. In order to avoid repetitions, the differences to the previous embodiments are essentially described below, and reference is otherwise made to the previous explanations.

In contrast to the embodiment according to FIGS. 10a and 10b, the length $l_Z$ of a journal 1180.1, 1180.2 corresponds to the length $l_{2L}$ of two adjacent light sources 1136, 1138. In particular, this further simplifies the production of a barrier element composite 1100.

Figure 12:
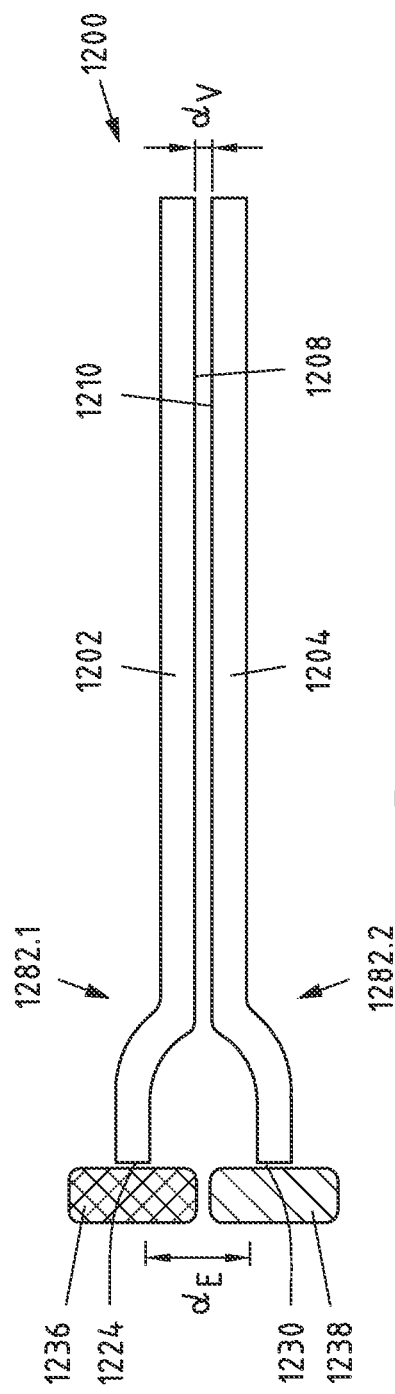

FIG. 12 shows a schematic view of a further embodiment of a barrier element composite 1200 according to the present application, in particular, an alternative embodiment to the embodiments according to FIGS. 10a or 10b and 11. In order to avoid repetitions, essentially the differences to the previous embodiments are described below, and reference is otherwise made to the previous explanations.

A first end area 1282.1 of the first barrier element 1202 with the first side surface 1224 of the first barrier element 1202 is deformed, in particular, with respect to a second end area 1282.2 of the second barrier element 1204 with the second side surface 1230 of the second barrier element 1204 such that the distance $\alpha_E$ between the first end area 1282.1 and the second end area 1282.2 is greater than the distance $\alpha_V$ between the second side surface 1208 of the first barrier element 1202 and the third side surface 1210 of the second barrier element 1204 in a connected area of said barrier elements 1202, 1204. By increasing the distance $\alpha_E$ between the first end area 1282.1 and the second end area 1282.2 by a deforming (e.g., bending) (compared to the connected areas, in particular, comprising the at least one light decoupling area), a barrier element composite 1200 with barrier elements having a small thickness (e.g., between 1 mm and 3 mm) and a small distance $\alpha_V$ (0.15 mm and 0.5 mm), it can be ensured that only light can be coupled into the first barrier element 1202 by the at least one first light source of a first light source arrangement 1236 and only light can be coupled into the second barrier element 1204 by the at least one second light source of a second light source arrangement 1238.

Figure 13:
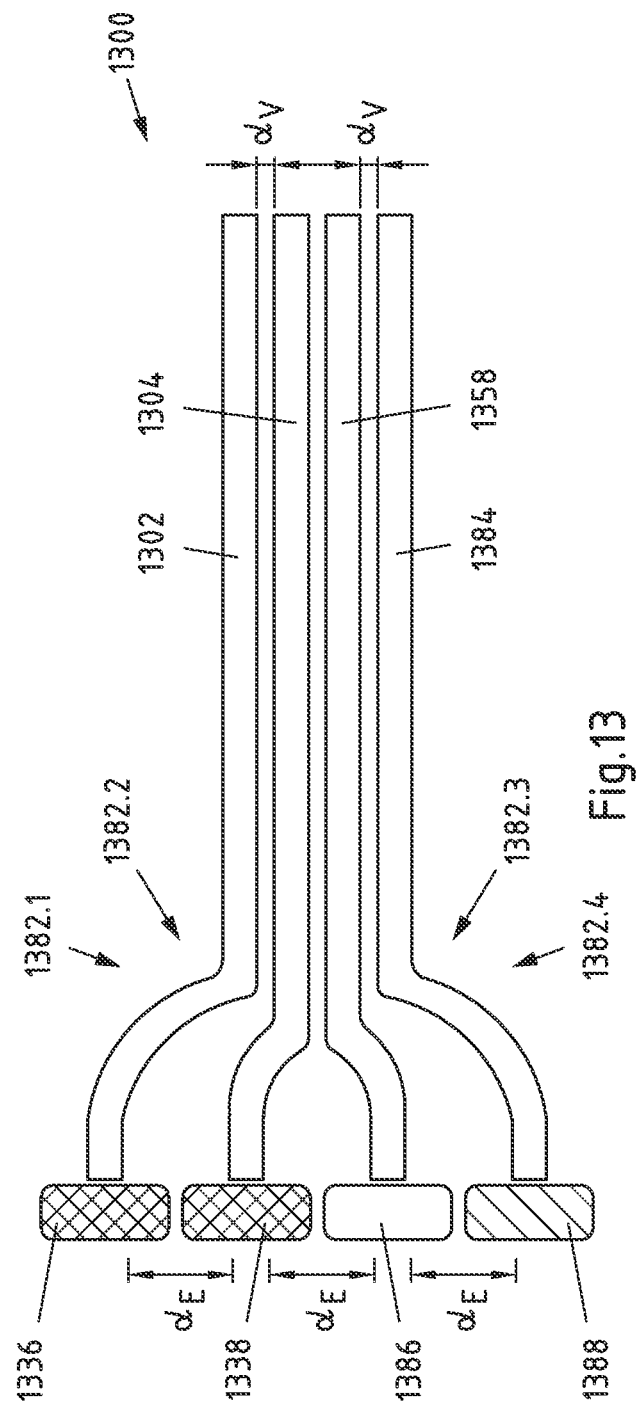

FIG. 13 shows a schematic view of a further embodiment of a barrier element composite 1300 according to the present application. In order to avoid repetitions, the differences to the previous embodiments (in particular, to FIG. 12) are essentially described below, and reference is otherwise made to the previous explanations.

In contrast to the embodiment according to FIG. 13, the barrier element composite 1300 comprises a first barrier element 1302 with a first end area 1382.1, a second barrier element 1304 with a second end area 1382.2, a third barrier element 1358 with a third end area 1382.3 and a fourth barrier element 1384 with a fourth end area 1382.4. The respective distance $\alpha_E$ between the respective end areas 1382.1 to 1382.4 is greater than the respective distance $\alpha_V$ between the respective barrier elements 1302, 1304, 1358, 1384 in the respective connected area of the barrier elements 1302, 1304, 1358, 1384 due to the deformation of these end areas 1382.1 to 1382.4. Light can be coupled into the respective barrier elements 1302, 1304, 1358, 1384 by the respective light sources 1336, 1338, 1386 and 1388.

Figure 14:
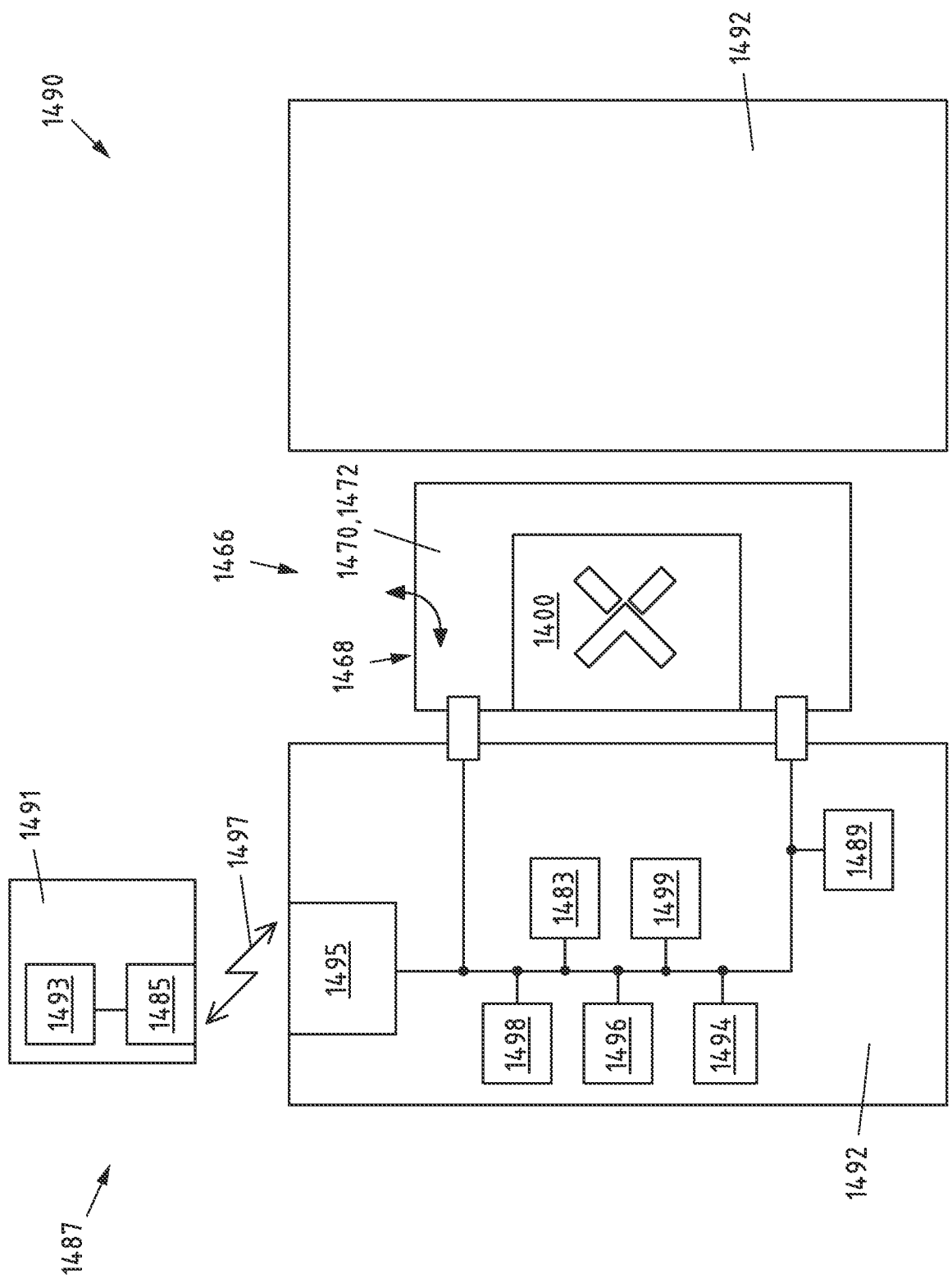

FIG. 14 shows a schematic view of an embodiment of an access control system 1490 according to the present application with an embodiment of a gate 1487 according to the present application. In the present application, the gate 1487 comprises a barrier element arrangement 1466, which may be formed, for example, according to the embodiment according to FIGS. 8a and 8b. For example, the barrier element arrangement 1466 can comprise a barrier element panel 1468 with a first outer panel 1470 and a second outer panel 1472 as well as an inserted barrier element composite 1400. In favor of a better overview, the details (e.g., the light source device) of the barrier element arrangement 1466 are not shown in FIG. 14. In variants of the application, a barrier element composite set may also be used.

In the present case, the access control system 1490 comprises a backend system 1491 and at least one gate 1487. In particular, a plurality of gates 1487 may be provided, for example, at least one gate array (also referred to as a gate array) with a plurality of gates.

In addition to the barrier element arrangement 1466, the gate 1487 comprises a base 1492. In the present case, the base 1492 is formed by two base bodies respectively stand bodies. The barrier element arrangement 1466 is movably attached to the base 1492. By means of at least one actuator 1499 (for example, an electric motor), the barrier element arrangement 1466 can be moved respectively displaced between a closed position (as shown in FIG. 14) and an open position. This is indicated by the arrow.

In particular, the actuator 1499 is integrated in the base 1492. In the present embodiment, a detection module 1494, a light source control 1496, a release equipment 1498, a communication module 1495, a data memory 1483 and an interface equipment 1489 are also integrated in the base 1492. It shall be understood that in other variants of the application, fewer elements or further elements may also be provided, such as a further interface equipment (which is based on a different transmission technology).

In particular, the communication module 1495 is configured to communicate with a communication module 1485 of the backend system 1491 via a (wireless and/or wired) remote communication network 1497.

The at least one interface equipment 1489 (e.g., a barcode scanner, a Bluetooth interface, NFC interface, a magnetic stripe reader, etc.) is, in particular, configured to receive an access authorization (ticket code, user ID, etc.) of the user from an access medium (described above and not shown) of the user. In particular, a valid access identifier allows the gate 1487 to be passed.

When an access authorization is obtained respectively received by the interface equipment 1489, it can be forwarded to the backend system 1491 by the communication module 1495. An evaluation module 1493 of the backend system 1491 can verify the forwarded access authorization (in a conventional manner), for example, by comparing it with stored permitted access identifiers. In other variants, an evaluation module can also be integrated in the gate.

The verification result can be transmitted to the gate 1487 by the communication module 1485. If, for example, it is determined that the forwarded access authorization is identical to a stored permitted access identifier and the forwarded access authorization is therefore a valid access authorization, a corresponding positive verification result can be transmitted. If, for example, it is determined that the forwarded access authorization is not identical to a stored permitted access identifier and the forwarded access authorization is therefore an invalid access authorization, a corresponding negative verification result can be transmitted.

The verification result can be provided to the release equipment 1498. For example, a release signal can be transmitted if the verification result is positive. Based on the verification result, the release equipment 1498 can control the actuator 1499. For example, the actuator 1499 can be controlled to cause the barrier element arrangement 1466 to move from the closed position to the open position (in the event of a positive verification result).

The detection module 1494 may be arranged to detect the current operational state of the gate 1487, as described, in particular, above. Preferably, at least one positive verification result and/or a status control signal can be provided to the detection module 1494.

The detected operating state may be provided to the light source controller 1496. At least one predetermined timing control sequence pattern may be stored in the data memory 1483, in particular, a plurality of predetermined timing control sequence patterns. A predetermined timing control sequence pattern may be associated with each operating state. For example, a corresponding assignment table can be stored.

Based on the detected operating state and, in particular, the assignment table, in which a timing control sequence pattern may be associated with each operating state, the light source controller 1496 may determine respectively select a timing control sequence pattern and control the light sources of the light source device of the barrier element arrangement 1466, as described, in particular, above.

In another embodiment, in particular, with a barrier element composite set, the light source controller 1496 may be configured to illuminate the two front sides of the barrier element composite set in different colors (for example, red and green) depending on an operational state of the gate 1487 so that a user can determine whether or not the gate 1487 is usable in the desired passage direction based on the color of the light output surface as the user approaches the gate 1487. In particular, a running light (as shown, for example, in FIG. 5) may be displayed.

It shall be understood that a gate 1487 of an access control system 1490 according to the application can also be designed with two barrier elements respectively barrier element panels 1468, one of which can be movably attached to the right part of the base 1942 and one of which can be movably attached to the left part of the base 1942. It shall be further understood that at least one barrier element respectively barrier element panel 1468 can be provided with a barrier element composite 1400 or a barrier element composite set according to the application.

Figure 15:
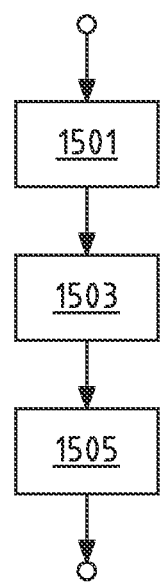

FIG. 15 shows a diagram of an embodiment of a method according to the present application. The method is used to operate a gate, such as the gate shown in FIG. 14.

In a first optional step 1501, in particular, an operating state of the gate is detected, as described.

In a next step 1503, in particular, a timing control sequence pattern is selected from at least a first timing control sequence pattern and a second timing control sequence pattern that differs from the first timing control sequence pattern, for example, based on the detected operating state.

In a step 1505, the light source device controls the light source device, in particular, according to the selected respectively determined timing control sequence pattern.

LIST OF REFERENCE SIGNS 100 barrier element composite
102 first barrier element
104 second barrier element
106 third side surface
108 second side surface
110 third side surface
112 second side surface
114 first light decoupling area
116 second light decoupling area
118 visible surface
122 separation layer
124 first side surface
126 narrow side
128 first light coupling area
130 first side surface
132 second light coupling area
200 barrier element composite
202 first barrier element
204 second barrier element
206 third side surface
208 second side surface
210 third side surface
212 second side surface
214 first light decoupling area
216 second light decoupling area
218 visible surface
222 separation layer
224 first side surface
228 first light coupling area
230 first side surface
232 second light coupling area
234 light source device
236 first light source arrangement
238 second light source arrangement
240 encapsulation
242 light
244 light
246 source separation layer
248 gap
250 partial encapsulation
252 partial encapsulation
254 cover layer
256 roughened surface area
266 barrier arrangement
300 barrier composite
302 first barrier element
304 second barrier element
322 separation layer
400 barrier element composite
402 first barrier element
404 second barrier element
406 third side surface
410 third side surface
414 first light decoupling area
416 first light decoupling area
424 first side surface
430 first side surface
500 barrier element composite
502 first barrier element
504 second barrier element
506 third side surface
514 first light decoupling area
516 second light decoupling area
558 third barrier element
560 third light decoupling area
600 barrier element composite
602 first barrier element
604 second barrier element
606 third side surfaces
612 second side surfaces
614 first light decoupling areas
616 second light decoupling areas
622 separation layers
662 barrier element composite set
700 barrier element composite
702 first barrier element
714 first light decoupling area
716 second light decoupling area
724 first side surface
726 narrow side
764 reflective layer
800 barrier element composite
802 first barrier element
804 second barrier element
814 first light decoupling area
816 second light decoupling area
864 reflective layer
866 barrier element arrangement
868 barrier element panel
870 first outer panel
872 second outer panel
874 spacer element
876 barrier element composite recess
878 separation layer
900 barrier element composite
924 first side surface
930 first side surface
936 first light sources
938 second light sources
1000 barrier element composite
1002 first barrier element
1004 second barrier element
1024 first side surface
1028 first light coupling area
1030 first side surface
1032 second light coupling area
1036 first light source arrangement
1038 second light source arrangement
1080 first and second pins
1100 barrier element composite
1136 first light source arrangement
1138 second light source arrangement
1180 first and second pins
1200 barrier element composite
1202 first barrier element
1204 second barrier element
1208 second side surface
1210 third side surface
1224 first side surface
1230 first side surface
1236 first light source arrangement
1238 second light source arrangement
1282 end area
1300 barrier element composite
1302 first barrier element
1304 second barrier element
1336 first light source arrangement
1358 third barrier element 1382 end area
1384 fourth barrier element
1400 barrier element composite
1466 barrier element arrangement
1468 barrier element panel
1470 first outer panel
1472 second outer panel
1483 data memory
1485 communication module
1487 gate
1489 interface equipment
1490 access control system
1491 backend system
1492 base
1493 evaluation module
1494 detection module
1495 communication module
1496 light source control
1497 remote communication network
1498 release equipment
1499 actuator

What is claimed is:

1. A barrier element composite for a barrier element arrangement of a gate of an access control system, comprising:
at least one first substantially optically transparent barrier element comprising a first side surface having a first light coupling area, a second side surface having at least one first light decoupling area and a third side surface forming a first visible surface and arranged opposite to the second side surface,
at least one second substantially optically transparent barrier element comprising a first side surface having a second light coupling area, a second side surface having at least one second light decoupling area and a third side surface arranged opposite to the second side surface,
wherein the third side surface of the second barrier element is connected to the second side surface of the first barrier element,
wherein an at least partially substantially optically transparent separation layer is arranged between the third side surface of the second barrier element and the second side surface of the first barrier element, and
wherein light decoupled by means of the first light decoupling area and the second light decoupling area is visible at the third side surface of the first barrier element.

2. The barrier element composite according to claim 1, wherein
the first light decoupling area is formed by a roughened surface area and by an optically non-transparent cover layer arranged over the roughened surface area,
and/or
the second light decoupling area is formed by a roughened surface area and by an optically non-transparent cover layer arranged above the roughened surface area.

3. The barrier element composite according to claim 1, wherein
the first light decoupling area is arranged offset from the second light decoupling area in such a way that when light is coupled into the first light coupling area, the light decoupled by means of the first light decoupling area is visible at the third side surface of the first barrier element and when light is coupled into the second light coupling area, the light decoupled through the second light decoupling area is visible at the third side surface of the first barrier element.

4. The barrier element composite according to claim 3, wherein
the first light decoupling area forms a first symbol shape,
the second light decoupling area forms a partial symbol shape or a second symbol shape, and
the first light decoupling area and the second light decoupling area together form a symbol shape composed of the first symbol shape and the partial symbol shape or the second symbol shape.

5. The barrier element composite according to claim 1, wherein
a reflective layer is arranged on at least one fourth side surface of the first barrier element,
and/or
a reflective layer is arranged on at least one fourth side surface of the second barrier element.

6. The barrier element composite according to claim 1, wherein
the barrier element composite comprises at least a third substantially optically transparent barrier element comprising a first side surface having a third light coupling area, a second side surface having at least one third light decoupling area and a third side surface arranged opposite to the second side surface,
wherein the third side surface of the third barrier element is connected to the second side surface of the second barrier element,
wherein an at least partially optically transparent separation layer is arranged between the third side surface of the third barrier element and the second side surface of the second barrier element, and
wherein light decoupled by means of the first light decoupling area, the second light decoupling area and the third light decoupling area is visible at the third side surface of the first barrier element.

7. The barrier element composite according to claim 6, wherein
a first end area of the first barrier element with the first side surface of the first barrier element is deformed with respect to a second end area of the second barrier element with the second side surface of the second barrier element in such a way that the distance between the first end area and the second end area is greater than the distance between the second side surface of the first barrier element and the third side surface of the second barrier element.

8. The barrier element composite according to claim 1, wherein
the first light coupling area of the first side surface of the first barrier element is formed by a first plurality of first pins protruding from the first side surface, and
the second light coupling area of the first side surface of the second barrier element is formed by a second plurality of second pins protruding from the first side surface.

9. The barrier element composite according to claim 8, wherein
in a connected state of the first barrier element and the second barrier element, the first pins are arranged offset relative to the second pins.

10. A barrier element composite set, comprising:
a first barrier element composite and at least one second barrier element composite, each of the first barrier element composite and at least one second barrier element composite being according to claim 1, wherein a second side surface of the first barrier element composite, which forms a rear side of the first barrier element composite, is connected to a second side face of the second barrier element composite, which forms a rear side of the second barrier element composite, and wherein an at least partially substantially optically transparent separation layer is arranged between the second side surface of the first barrier element composite and the second side surface of the second barrier element composite.

11. A barrier element arrangement of a gate of an access control system, comprising:

a barrier element composite set according to claim 10, and at least one light source device comprising at least one first light source arrangement configured to couple light into the first light coupling area, and at least one second light source arrangement configured to couple light into the second light coupling area.

12. The barrier element arrangement according to claim 11, wherein the barrier element arrangement comprises a substantially transparent barrier element panel with a barrier element composite recess located between a first outer panel and a second outer panel, wherein an inner shape of the barrier element composite recess corresponds to an outer shape of the barrier element composite and/or the barrier element composite set in such a way that the barrier element composite or the barrier element composite set is insertable into the barrier element composite recess.

13. The barrier element arrangement according to claim 12, wherein the barrier element panel comprises a spacer element arranged in an edge area on at least two narrow sides of the barrier element panel between the first outer panel and the second outer panel, wherein the thickness of the spacer element substantially corresponds to the thickness of the barrier element composite or the barrier element composite set.

14. A gate of an access control system, comprising:

at least one base, and at least one barrier element arrangement movably attached to the base between an open position and a closed position, wherein the barrier element arrangement is a barrier element arrangement according to claim 11.

15. The gate according to claim 14, wherein the gate comprises at least one light source controller configured to control the light source device based on at least one predetermined timing control sequence pattern, wherein the timing control sequence pattern specifies at least a first activation start time and a first activation time duration of the first light source arrangement, a second activation start time and a second activation time duration of the second light source arrangement and a repetition criterion.

16. The gate according to claim 15, wherein the timing control sequence pattern specifies a first color code for the first activation start time of the first light source arrangement and a second color code for the second activation start time of the second light source arrangement.

17. The gate according to claim 15, wherein at least one first timing control sequence pattern and at least one second timing control sequence pattern different from the first timing control sequence pattern are predetermined, and the light source controller is configured to select one of the stored timing control sequence patterns based on an operating state of the gate.

18. A method of operating a gate according to claim 14, comprising:

controlling, by a light source controller, the light source device of the barrier element arrangement based on a timing control sequence pattern, wherein the timing control sequence pattern specifies at least a first activation start time and a first activation time duration of the first light source device, a second activation start time and a second activation time duration of the second light source device and a repetition criterion.

19. The method of operating a gate according to claim 18, wherein the timing control sequence pattern specifies a first color code for the first activation start time of the first light source arrangement and a second color code for the second activation start time of the second light source arrangement.

* * * * *